(12) United States Patent
Okano

(10) Patent No.: US 6,510,384 B2
(45) Date of Patent: Jan. 21, 2003

(54) ROUTE SEARCH SYSTEM AND ROUTE SEARCH METHOD

(75) Inventor: Hiroyuki Okano, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/998,957

(22) Filed: Nov. 15, 2001

(65) Prior Publication Data

US 2002/0082772 A1 Jun. 27, 2002

(30) Foreign Application Priority Data

Nov. 15, 2000  (JP) .......................................  2000-348459

(51) Int. Cl.[7] .............................................. G01C 21/02
(52) U.S. Cl. ....................................... 701/209; 701/201
(58) Field of Search ................................. 701/202, 201, 701/209, 210, 25, 26; 342/357.09, 357.13

(56) References Cited

U.S. PATENT DOCUMENTS 5,974,356 A  * 10/1999  Doyle et al. ................ 701/209

* cited by examiner

Primary Examiner—Yonel Beaulieu
(74) Attorney, Agent, or Firm—Marc D. McSwain

(57) ABSTRACT

A method for increasing the execution speed of a cost-minimizing routing algorithm, as employed in trucking or job shop scheduling. Penalty functions for succeeding transit points along a route are added and examined for validity during trial route evaluation. A soft time window is set for each transit point, and proposed routes are evaluated using a total cost including all soft time windows along the route and the length of the route. A static soft time window function and a dynamic soft time window function are correlated with each transit point. The dynamic soft time window function for each transit point is the sum of the static soft time window function for the Transit point and the dynamic soft time window function for a succeeding transit point in the direction of travel.

37 Claims, 12 Drawing Sheets

Example time window restriction : 10 : 30
Hereinafter should be
scheduled before 11 : 45.

ROUTE SEARCH SYSTEM AND ROUTE SEARCH METHOD

FIELD OF THE INVENTION

The present invention relates to a route search method, used for scheduling or distribution fields, that employs time windows to increase the speed of execution of an algorithm employed for a routing problem.

DESCRIPTION OF RELATED ART

The routing problem in this specification involves calculations used to determine in what order a truck, which departs from and returns to an initial location, must arrive at a number of intervening transit points to ensure that the least time is spent on the road (the required time) and the least (shortest) distance is traveled. A further, included problem is one wherein multiple trucks are scheduled to visit a set of transit points. For routing problems for which "time windows" are used, time restrictions are imposed. For example, specific times are set for a truck to depart from and return to an initial location, while for each intervening transit point visited en route, a time range is established for the arrival of the truck, with a late arrival being regarded as a delay. In FIG. 1, for example, the time restriction imposed provides for the arrival at a transit point Px within a time range, illustrated by the hard time window in prior art FIG. 2, extending from 10:30 to 11:45. In FIG. 2, the initial sets EST (Earliest Start Time) and LST (Latest Start Time) represent a static earliest arrival time and a static latest arrival time established for a specified transit point. Costs outside the time window become infinite.

In addition, the total weight or number of products to be delivered to transit points must not exceed the loading capacity of a truck. This is a problem, for one truck, called the TSPTW (Traveling Salesman Problem with Time Windows) or the VRPTW (Vehicle Routing Problem with Time Windows). One of the VRPTWs that appear in a scheduling field (job shop scheduling) is a problem, involving the determination of the order in which jobs are to be processed by a machine, for which preparation time between jobs is especially required. In this case, a truck corresponds to a machine, and a transit point corresponds to a job. Each job must be processed following the time whereat the process at a preceding step is terminated, and must be transferred to a succeeding step before a deadline is reached. When a required time (called "make span") is reduced by satisfying such a restriction, the operating ratio for the machine can be improved. For a scheduling field, the number of transit points is frequently equal to or greater than 10,000, and a great demand exists for a scaleable algorithm.

As the algorithm used for the above problem, a local search method is generally employed. That is, an operation is repeated whereby a "part of a route after departing a specific solution is moved to another portion, and when the length of the route is reduced, that movement is employed". The following example shows an operation performed to move the location of a specific transit point and an operation for exchanging two transit points. An operation for moving or exchanging continuous transit points (paths) is also generally employed. The location or locations to be moved or exchanged may be either along a route or between different routes. Changes effected for transit points are shown in FIGS. 3A and 3B. In FIG. 3A, a transit point X is moved from the right route to the left route, and in FIG. 3B, a transit point X, along the right route, is exchanged with a transit point Y, along the left route.

The time required for the execution of the algorithm for this problem is determined mainly by the following two factors.

(a) The procedures required for route evaluation when a part of a route is moved to another location.

(b) The number of trials required when moving a part of a route to another location.

The method that could most easily be used for (a) is probably one that provides for the evaluation of a route by traveling it (while calculating the required time). According to this method, however, $O(n)$ procedures are required when the number of transit points is defined as n. As for (b), at least n trials will be required, and the general trend will be for the problem size to be empirically increased until it is close to $O(\text{square of } n)$. Therefore, when the procedures required for the first method are multiplied by $O(n)$, the algorithm is at least $O(\text{square of } n)$, or is empirically increased close to $O(\text{cube of } n)$, so that scalability of a large problem is not possible.

It is, therefore, one object of the present invention to reduce the time required for route evaluation when in the routing problem one part of a route is moved to another location, and to ensure scalability of even a large problem.

SUMMARY OF THE INVENTION

The aim of the present invention is the implementation of the following points.

(a) The employment of a penalty function that can be added.

(b) The addition of penalty functions for all succeeding transit points following transit points along a route, and the storage of the results at the pertinent transit points.

(c) The efficient examination of whether the addition time information for each transit point is valid. In this invention, by implementing these points, the time required for route evaluation can be limited substantially to a constant time.

DETAILED DESCRIPTION

Figure 1:
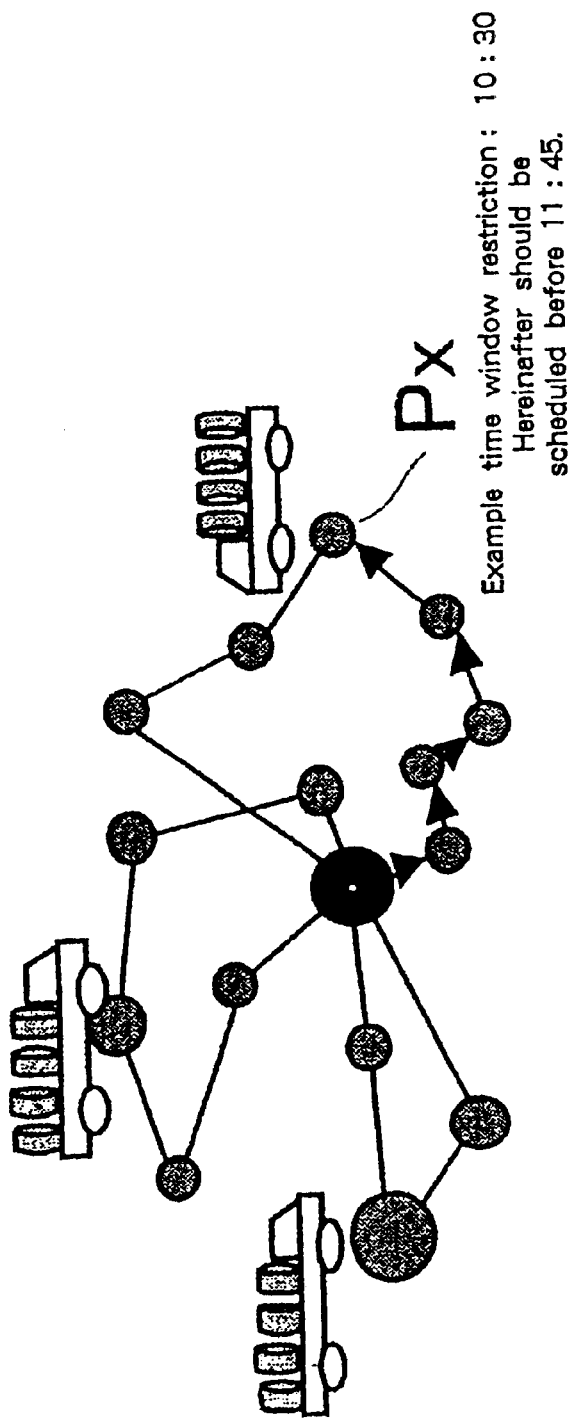
FIG. 1 is a diagram used for explaining the time window restrictions for a transit point for a delivery route scheduling problem for a distribution field.
Figure 2:
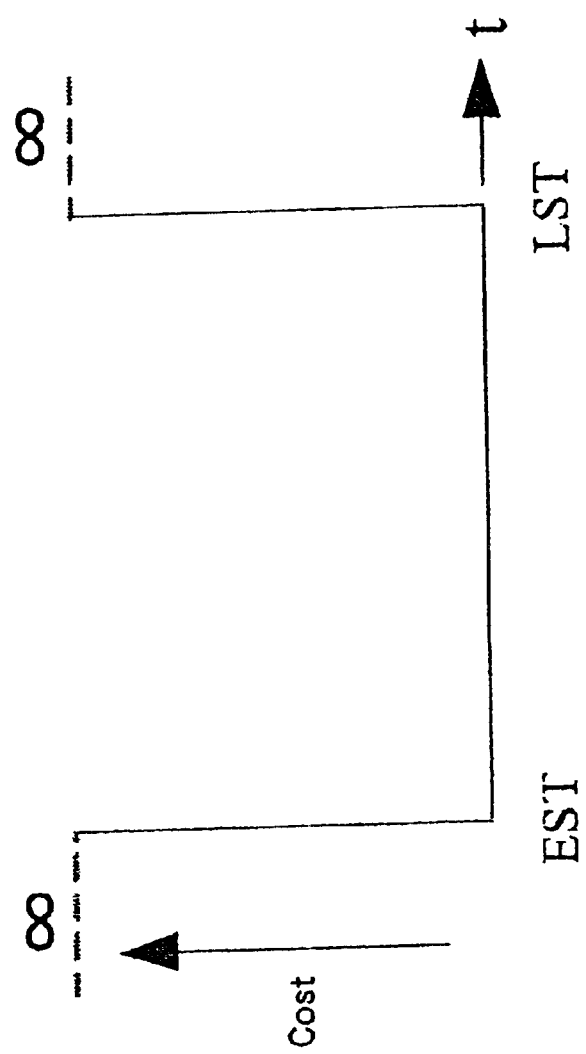
FIG. 2 is a diagram showing the time window restrictions for a hard time window.
Figure 3:
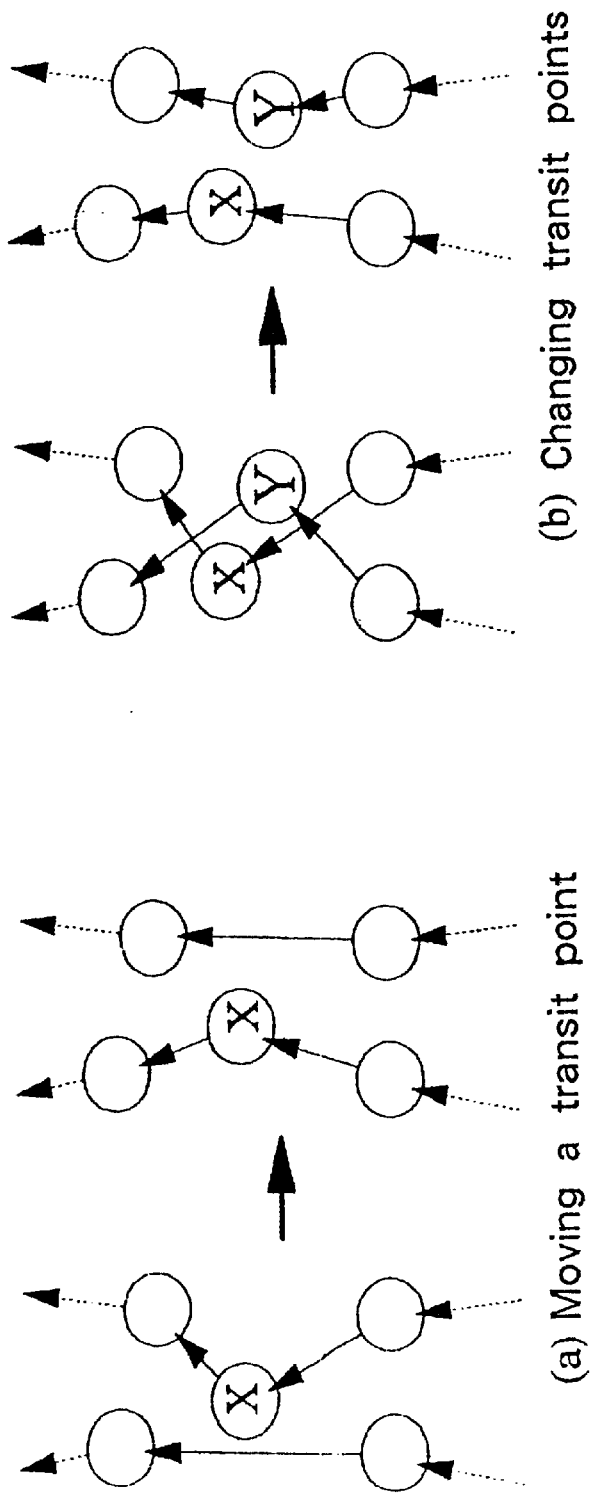
FIG. 3 is a diagram showing an example transit point change.

The following specific terms, defined as indicated, are used throughout the specification. Route segment: a portion, corresponding to a route, that includes at least one transit point.

Original route and trial route: when two routes are compared, the route used as a reference is the original route and the route provided by changing the original route is a trial route.

Target route segment to be changed: a route segment, of a trial route, whereat the location of a transit point differs from its relative position along an original route; a route segment that is inserted or extracted; or a route segment that is sandwiched between two such segments. $P_z$: the last transit point along a route.

According to a first aspect of the invention, a route search system comprises:

dynamic penalty function addition means;

route segment dynamic penalty function calculation means;

route segment penalty cost calculation means;

route evaluation means; and dynamic penalty function validity determination means, wherein a static penalty function f, which is a cost function of an arrival time variable t and is a base for calculation of a penalty cost, is set for each transit point, wherein the static penalty function f is so defined that the static penalty functions for individual transit points are enabled to be added, wherein an original route and a trial route are evaluated based on the total cost CT that includes, for each route, at least a penalty cost CS and a length cost CL, wherein a dynamic penalty function F is correlated with each transit point, wherein the dynamic penalty function addition means calculates the dynamic penalty function F for each transit point along the route, extending backward, in the direction opposite to that of normal propagation, from the last transit point $P_z$, wherein, when an arbitrary transit point is called P1 and a succeeding transit point in the direction of travel is called P2, the dynamic penalty function addition means calculates a dynamic penalty function F for P1 based on the sum of a static penalty function f for P1 and the dynamic penalty function F for P2, while, it should be noted, for the dynamic penalty function addition, a t in the dynamic penalty function F for P2 is defined as a t in the static penalty function f, to which a value equal to the difference between the arrival time for P2 and the arrival time for P1 is added, wherein, when the first and last transit points along a target route segment to be changed on the original route are called P1 and P2 (P2=P1 may be established) and the succeeding transit point, following P2, along the original route in the direction of travel is called P3, and when the dynamic penalty function validity determination means determines that the dynamic penalty functions for transit points following P1, along the original route, are valid, the route segment dynamic penalty function calculation means, the dynamic penalty function F for the target route segment is calculated based on the results obtained by subtracting the dynamic penalty function F for P3 from the dynamic penalty function F for P1, while, it should be noted, a t in the dynamic penalty function for P3 is defined as the t in the dynamic penalty function for P1, to which the difference between the arrival time for P3 and the arrival time for P1 is added, wherein, when the first transit points along the target route segments of the original route and a trial route are defined as P1, the route segment penalty cost calculation means calculates penalty costs for the target route segments by substituting the arrival times at the transit points P1 along the original route and the trail route into arrival time variables t in the dynamic penalty functions of the route segments that are obtained by the route segment dynamic penalty function calculation means, and wherein the route evaluation means evaluates the original route and the trial route by comparison of the penalty costs for the target change route segments.

As used herein, "static" means unchanging, and "dynamic" means time-transient changing. The term, "enabled to be added", will now be described. Assume that B and C are added together to obtain A, such as in A=B+C. When two piece-wise linear functions are added together, the number of items represented by A is the sum of the items represented by B and C. Further, when B and C are polynomial equations, A is also a polynomial equation having the same order, and the amount of data falls within a constant range. This characteristic is expressed as "being enabled to be added". That is, "being enabled to be added" is a characteristic according to which, even for addition, the amount of data falls within a specific range, and for which repetitive addition is available. It should also be noted that B and C need not have the same order. Further, in this specification, terms are defined as needed, as in "is hereinafter called or referred to"; however, these terms are temporary and other, arbitrary terms may actually be employed.

The routing problems for this invention include those associated with time windows, that is, they are routing problems associated with soft time windows and with hard time windows. For these routing problems, for each transit point static earliest arrival and latest arrival times are established to inhibit early and late arrivals at the transit point. The routing problems handled using this invention include at the least routing problems for which soft time windows are factors to be considered. For such a routing problem, the cost incurred upon the imposition of a penalty is termed a soft window cost. Furthermore, static and dynamic penalty functions for soft time windows are respectively termed static soft time window functions and dynamic soft time window functions.

For the evaluation of a route for a routing problem, the total of the penalty costs for all transit points must be calculated, and for a conventional routing system, the labor that is required for the calculation of the penalty costs for one change of a routing segment corresponds to n transit points. This is because the amount of data in a piece-wise linear function is proportional to n transit points. Whereas, in accordance with the first aspect of the invention, a dynamic penalty function is calculated in advance for each transit point, and when a target route segment to be changed is present in an original route following the first transit point for which it is ascertained the dynamic penalty function is valid, the arrival times at the first transit points along the original route and along a trial route need only be substituted into the arrival time variables t of the dynamic penalty functions for the foremost transit points, so that the penalty costs can be obtained for the target route segments on the original route and the trial route. Thus, the number of calculations can be reduced considerably.

According to a second aspect of the invention, in the route search system of the first aspect, when the succeeding transit points of the last target route segments to be changed on the original route and of the trial route in the direction of travel are defined as P3, and when route segments from the transit points P3 to Pz are called forward route segments, the route segment penalty cost calculation means calculates the penalty costs for the forward route segments of the original route and of the trial route by substituting the arrival times at the transit points P3 along the original route and along the trial route into the arrival time variables t for the dynamic penalty functions for the transit points P3; and the route evaluation means evaluates the original route and the trial route based on the comparison of the penalty costs for the forward route segments of the original route and of the trial route.

The penalty costs for the forward route segments of the original route and the trial route can be obtained by substituting the arrival times at P3 along the original route and along the trial route into the arrival time variables t of the dynamic penalty functions for P3. As a result, the need for the labor required to individually calculate the penalty costs for the individual transit points can be eliminated.

In the following embodiments, a target route segment to be changed corresponds to a path B→C→D, and a forward route segment corresponds to a path E→F→G.

According to a third aspect of the invention, the route search system of the second aspect further comprises:

time offset holding means, wherein, as an arrival time, a time offset is employed that is represented by an offset, held by the time offset holding means, from a reference time Tb, and wherein, when the total cost CT of the trial route is smaller than the total cost CT of the original route, and each time the original route is updated to a trial route, the time offset holding means updates the reference time Tb based on a change L_reduce for the time re-calculation length of the updated route.

The time offset from the reference time Tb is employed as the arrival time, and the reference time Tb is updated each time the route is updated. Therefore, instead of changing the arrival time at each transit point on each occasion, the arrival time at each transit point can be updated by changing only the referenced time Tb, and the number of required calculations can be reduced.

According to a fourth aspect of the invention, the route search system of the third aspect further comprises:

first arrival time offset calculation means, for calculating an arrival time offset a that, through inverse propagation initiated at the last transit point Pz, is set for each transit point along a route, wherein, when an arbitrary transit point is defined as P1 and an immediately succeeding transit point in the direction of travel is defined as P2, the first arrival time offset calculation means calculates an arrival time offset a_P1, for the transit point P1, based on the results obtained by subtracting from an arrival time offset a_P2, for the transit point P2, the sum of the time d(P1, P2), for the travel between P1 and P2, and a working time w_P1, for the transit point P1, and wherein the dynamic penalty function addition means determines, as the arrival time offset a, which is obtained by the first arrival time offset calculation means, an arrival time that is to be used by the dynamic penalty function addition means for calculating an arrival time difference.

Since the transit point is correlated with the arrival time offset that is obtained, through forward propagation, by the first arrival time offset calculation means, when the arrival time offset is valid, it can immediately be used to calculate the dynamic penalty function for each transit point, so that the calculation can be rationalized. It should be noted (a) that when the route is so formed that it returns from the last transit point Pz to the first transit point Pa, the arrival time offset at Pz is calculated based on the results obtained by subtracting from the time re-calculation length L_total, for the original route, the sum of the working time w_Pz at Pz and the time d(Pz, Pa) for the travel between Pz and Pa; and (b) that when the route does not return to the first transit point Pa, the arrival time offset for Pz is calculated based on the results obtained by subtracting the working time w_Pz at Pz from the time re-calculation length L_total for the original route.

According to a fifth aspect of the invention, the route search system of the fourth aspect further comprises:

second arrival time offset calculation means, wherein it is ascertained that the arrival time offset a is changed at all the transit points along the trial route from a point whereat a target route segment to be changed is inserted or extracted, wherein the preceding transit point along the first target route segment to be changed on the original route in the direction of travel is defined as P0, wherein the second arrival time offset calculation means calculates an arrival time offset a_i at a transit point i using an arrival time offset a_P0 at P0 along a trial route in the direction of travel, wherein, when an arbitrary transit point is defined as P1 and an immediately succeeding transit point in the direction of travel is defined as P2, the second arrival time offset calculation means calculates an arrival time offset a_P2 at the transit point P2 based on the results obtained by adding an arrival time offset a_P1, at the transit point P1, to the sum of a working time w_P1 for P1, and time d(P1, P2) for the travel between P1 and P2, wherein the route segment penalty cost calculation means determines an arrival time, which is to be substituted into t in the dynamic penalty function for the route segment obtained by the route segment dynamic penalty function calculation means, as the time obtained by adding the reference time Tb to the arrival time offset a, that is obtained by the second arrival time offset calculation means for the first transit point along the route segment.

For the calculation of the penalty cost for the target route segment to be changed on the trial route, the arrival time offset a, which is obtained in the forward propagation direction originating at the last transit point before the route segment and which had a valid arrival time offset (i.e., the transit point immediately before the first target route segment to be changed in the direction of travel), is substituted into the arrival time variable t of the dynamic penalty function of the route segment. As a result, the time required for the calculation of the arrival time offset a can be reduced.

According to a sixth aspect of the invention, the route search system of the fifth aspect further comprises:

first dynamic earliest arrival time calculation means for calculating, through inverse propagation originating at the last transit point Pz, a dynamic earliest arrival time E that is correlated with a static earliest arrival time e that is set for each transit point along a route to inhibit an arrival earlier than the static earliest arrival time e, wherein, when an arbitrary transit point is defined as P1 and the immediately succeeding transit point in the direction of travel is defined as P2, the first dynamic earliest arrival time calculation means determines the dynamic earliest arrival time E for P1, as a later time, either a static earliest arrival time e_P1 for P1, or the value obtained by subtracting from a dynamic earliest arrival time E_P2 for P2, the sum of a work time w_P1 for P1, and a time d(P1, P2) for the travel between P1 and P2, and wherein, when the time obtained by adding the reference time Tb to the arrival time offset a, which is obtained for the forward route segment of the trial route by the first arrival time offset calculation means, is earlier than the dynamic earliest arrival time E for the forward route segment, which is obtained by the first dynamic earliest arrival time calculation means, the penalty cost calculation means halts the calculation of a penalty cost for the forward route segment of the trial route.

For all the transit points i along the target route segment to be changed, only the transit point having the strictest condition (the latest one among the static earliest arrival times) need be examined in order to determine whether the arrival times a_i at all the transit points i are later than the static earliest arrival time e_i. According to the sixth aspect, the earliest arrival time having the strictest condition is calculated while inversely tracking the forward route segment from its end, and when the condition for the earliest arrival time is not satisfied, the penalty cost calculation means halts the calculation of the penalty cost for the forward route segment of the trial route. As a result, unnecessary calculations can be avoided, and the calculation speed can be increased.

According to a seventh aspect of the invention, the route search system of the sixth aspect further comprises:

second dynamic earliest arrival time calculation means, for calculating the dynamic earliest arrival time E for a target route segment to be changed, wherein, when the first and the last transit points along the target route segment to be changed are called P1 and P2 (P2=P1 may be established), the second dynamic earliest arrival time calculation means determines, as the dynamic earliest arrival time E for the target route segment to be changed, which is the later time, the static earliest arrival time e_P1 for P1, or a value obtained by subtracting from the static earliest arrival time e_P2 for P2, the difference between a_P2 and a_P1, which are arrival time offsets for P2 and P1 obtained by the first arrival time offset calculation means, and wherein, when the time value obtained by adding the reference time Tb to the arrival time offset a, which is calculated by the first or second arrival time offset calculation means for the target route segment to be changed on the trial route, precedes the dynamic earliest arrival time E for the target route segment that is obtained by the second dynamic earliest arrival time calculation means, the penalty cost calculation means halts the calculation of the penalty cost for the target route segment to be changed on the trial route.

According to the seventh aspect, the earliest arrival time having the strictest condition is temporarily estimated by using the static earliest arrival times for the first and the last transit points along the target route segment to be changed, without all the transit points along this route having to be tracked. Thus, if the condition for the earliest arrival time is not satisfied, the calculation of the penalty costs for the forward route segment and the target route segment to be changed is halted, so that unnecessary calculations can be avoided and the calculation speed increased.

According to an eighth aspect of the invention, the route search system of the seventh aspect further comprises:

first dynamic latest arrival time calculation means for calculating, through inverse propagation originating at the last transit point Pz, a dynamic latest arrival time L that is correlated with a static latest arrival time 1 that is set for each transit point along a route to inhibit an arrival later than the static latest arrival time 1, wherein, when an arbitrary transit point is defined as P1 and the immediately succeeding transit point in the direction of travel is defined as P2, the first dynamic latest arrival time calculation means determines the dynamic latest arrival time L for P1, as an earlier time, either a static latest arrival time 1_P1 for P1, or the value obtained by subtracting from a dynamic latest arrival time L_P2 for P2, the sum of a work time w_P1 for P1, and a time d(P1, P2) for the travel between P1 and P2, and wherein, when the time obtained by adding the reference time Tb to the arrival time offset a, which is obtained for the forward route segment of the trial route by the first arrival time offset calculation means, is later than the dynamic latest arrival time L for the forward route segment, which is obtained by the first dynamic latest arrival time calculation means, the penalty cost calculation means halts the calculation of a penalty cost for the forward route segment of the trial route.

For all the transit points i along the route segment, only the transit point having the strictest condition (the latest one among the static latest arrival times) need be examined in order to determine whether the arrival times a_i at all the transit points i are earlier than the static latest arrival time 1_i. According to the eighth aspect, the latest arrival time having the strictest condition is calculated while inversely tracking the forward route segment from its end, and when the condition for the latest arrival time is not satisfied, the penalty cost calculation means halts the calculation of the penalty cost for the forward route segment of the trial route. As a result, unnecessary calculations can be avoided, and the calculation speed can be increased.

According to a ninth aspect of the invention, the route search system of the eighth aspect further comprises:

second dynamic latest arrival time calculation means, for calculating the dynamic latest arrival time L for a target route segment to be changed, wherein, when the first and the last transit points along the target route segment to be changed are called P1 and P2 (P2=P1 may be established), the second dynamic latest arrival time calculation means determines, as the dynamic latest arrival time L for the target route segment to be changed, which is the earlier time, the static latest arrival time l_P1 for P1, or a value obtained by subtracting from the static latest arrival time l_P2 for P2, the difference between a_P2 and a_P1, which are arrival time offsets for P2 and P1 obtained by the first arrival time offset calculation means, and wherein, when the time value obtained by adding the reference time Tb to the arrival time offset a, which is calculated by the first or second arrival time offset calculation means for the target route segment to be changed on the trial route, precedes the dynamic latest arrival time L for the target route segment to be changed that is obtained by the second dynamic latest arrival time calculation means, the penalty cost calculation means halts the calculation of the penalty cost for the target route segment to be changed on the trial route.

According to the ninth aspect, the latest arrival time having the strictest condition is temporarily estimated by using the static latest arrival times for the first and the last transit points along the target route segment to be changed, without all the transit points along this route having to be tracked. Thus, if the condition for the latest arrival time is not satisfied, the calculation of the penalty costs for the forward route segment and the target route segment to be changed is halted, so that unnecessary calculations can be avoided and the calculation speed increased.

According to a tenth aspect, the route search system of the ninth aspect further comprises:

first dynamic length calculation means for calculating a dynamic length W, which is correlated with each transit point along a route, through inverse propagation originating at the last transit point Pz;

arrival time offset validity determination means; and second dynamic length calculation means, wherein, when an arbitrary transit point is defined as P1 and the immediately succeeding transit point in the direction of travel is defined as P2, the first dynamic length calculation means determines, as a dynamic length W_P1 for P1, a value based on the results obtained by adding a dynamic length W_P2 for P2, to the sum of the travel time between P1 and P2 and a working time for P1, wherein, when the arrival time offset validity determination means ascertains that arrival time offsets for transit points following P1 along the original route are valid, and when the first and last transit points along the target route segment to be changed are called P1 and P2 (P2=P1 may be established) and the succeeding transit point, following P2, along the original route in the direction of travel is called P3, the second dynamic length calculation means obtains the dynamic length W for the target route segment to be changed by subtracting from a dynamic length W_P1 for P1, the sum of a dynamic length W_P3 for P3, and the travel time between P2 and P3, wherein, when a dynamic length for the target route segment obtained by the second dynamic length calculation means is defined as W, the second arrival time offset calculation means calculates an arrival time offset of a_P3 for P3, based on the results obtained by adding an arrival time offset a_P1 for P1, to the sum of the dynamic length W and the travel time between P2 and P3.

When the arrival time for a specific transit point P0 is known and two target route segments to be changed, A and B, follow the transit point P0 in the direction of travel, and when the transit points on the route segment A are tracked from the transit point P0 in the direction of travel in order to obtain the arrival time for the first transit point on the route segment B, a time proportional to the number of transit points on the route segment A is required. According to the tenth aspect, since the dynamic length W for the route segment A is calculated using the difference between the arrival time, in the direction of travel, for the first transit point on the route segment A on the original route and the arrival time for the succeeding transit point on the route segment A, the calculation performed for tracking the transit points on the route segment A can be eliminated.

According to an eleventh aspect of the invention, the route search system of the tenth aspect further comprises:

rank provision means for providing ranks, in descending order in the direction of travel, for transit points along a route;

rank storage means for, when the dynamic penalty function addition means initiates the propagation of the dynamic penalty function, storing the ranks at the foremost transit point from a transit point that has been propagated, wherein, when a transit point has a rank value equal to or smaller than a value stored in the rank storage means, the dynamic penalty function validity determination means ascertains that a dynamic penalty function for the transit point is valid, and wherein, when the original route is updated to a trial route, and when P0 and P3 denote transit points in the inverse direction of travel and in the forward direction of travel from a point on the updated route whereat a target route segment to be changed is inserted, the rank provision means provides intermediate ranks between the rank for P0 and the rank for P3 for the individual transit points in the descending order in the direction of travel along the target route segment to be changed on the updated route.

In order to provide ranks for individual transit points on a route segment when a target route segment to be changed is inserted into a trial route, it is preferable that large intervals be provided between ranks when they are initially provided for transit points, in the descending order, by the rank provision means. If this is done, when the route is updated a problem can be prevented that is occasioned by a need to reissue, in the descending order, ranks for all the transit points on the route.

According to a twelfth aspect of the invention, in the route search system of the eleventh aspect, the inverse propagation, by the individual means, of the dynamic penalty function F, the dynamic earliest arrival time E, the dynamic latest arrival time L and the dynamic length W occurs simultaneously, and the dynamic penalty function validity determination means also serves as means for determining whether the dynamic earliest arrival time E, the dynamic latest arrival time L and the dynamic length W for each transit point are valid.

Since only one validity determination means is required to determine the validity of the dynamic penalty function F, the dynamic earliest arrival time E, the dynamic latest arrival time L and the dynamic length W, the structure can be simplified.

According to a thirteenth aspect of the invention, the route search system of the twelfth aspect further comprises:

a transit point pointer, for, when inverse propagation of the dynamic penalty function F, the dynamic earliest arrival time E, the dynamic latest arrival time L and the dynamic length W is employed, pointing at the foremost transit point from a transit point that has been inversely propagated, wherein the contents of the transit point pointer are updated, so that the transit point pointer designates as the next transit point a transit point that, in the direction of travel, is adjacent to the last target route segment to be changed on the updated route, and wherein inverse propagation is next employed for the dynamic penalty function F, the dynamic earliest arrival time E, the dynamic latest arrival time L and the dynamic length W, beginning at a transit point preceding the transit point pointed at by the transit point pointer.

Since inverse propagation is employed for the calculations for the dynamic penalty function F, the dynamic earliest arrival time E, the dynamic latest arrival time L and the dynamic length W, the Fs, Es, Ls and Ws prepared for transit points preceding a changed point on an updated (new) route are not accurate. Therefore, the foremost transit point, whereat the accurate dynamic penalty function F, dynamic earliest arrival time E, dynamic latest arrival time L and dynamic length W are held is identified by preparing the transit point pointer, so that labor incident to the re-calculations required because of the employment of inverse propagation can be reduced.

According to a fourteenth aspect of the invention, in the route search system of the first aspect, changes effected for a route segment of a route include the movement and the deletion of a route segment and the insertion of the route segment into another predetermined location in another route.

According to a fifteenth aspect of the invention, a route search method comprises:

a dynamic penalty function addition step;

a route segment dynamic penalty function calculation step;

a route segment penalty cost calculation step;

a route evaluation step; and a dynamic penalty function validity determination step, wherein a static penalty function f, which is a cost function of an arrival time variable t and is a base for calculation of a penalty cost, is set for each transit point, wherein the static penalty function f is so defined that the static penalty functions for individual transit points are enabled to be added, wherein an original route and a trial route are evaluated based on the total cost CT that includes, for each route, at least a penalty cost CS and a length cost CL, wherein a dynamic penalty function F is correlated with each transit point, wherein, at the dynamic penalty function addition step, the dynamic penalty function F is calculated for each transit point along the route, extending backward, in the direction opposite to that of normal propagation, from the last transit point $P_z$, wherein, when an arbitrary transit point is called P1 and a succeeding transit point in the direction of travel is called P2, at the dynamic penalty function addition step, a dynamic penalty function F for P1 is calculated based on the sum of a static penalty function f for P1 and the dynamic penalty function F for P2, while, it should be noted, for the dynamic penalty function addition, a t in the dynamic penalty function F for P2 is defined as a t in the static penalty function f, to which a value equal to the difference between the arrival time for P2 and the arrival time for P1 is added, wherein, when the first and last transit points along a target route segment to be changed on the original route are called P1 and P2 (P2=P1 may be established) and the succeeding transit point, following P2, along the original route in the direction of travel is called P3, and when it is determined at the dynamic penalty function validity determination step that the dynamic penalty functions for transit points following P1, along the original route, are valid, at the route segment dynamic penalty function calculation step, the dynamic penalty function F for the target route segment is calculated based on the results obtained by subtracting the dynamic penalty function F for P3 from the dynamic penalty function F for P1, while, it should be noted, a t in the dynamic penalty function for P3 is defined as the t in the dynamic penalty function for P1, to which the difference between the arrival time for P3 and the arrival time for P1 is added, wherein, when the first transit points along the target route segments to be changed of the original route and a trial route are defined as P1, at the route segment penalty cost calculation step, penalty costs for the target route segments are calculated by substituting the arrival times at the transit points P1 along the original route and the trail route into arrival time variables t in the dynamic penalty functions of the route segments that are obtained at the route segment dynamic penalty function calculation step, and wherein, at the route evaluation step, the original route and the trial route are evaluated by comparison of the penalty costs for the target change route segments.

According to a sixteenth aspect of the invention, in the route search method of the fifteenth aspect, when the succeeding transit points of the last target route segments to be changed on the original route and of the trial route in the direction of travel are defined as P3, and when route segments from the transit points P3 to Pz are called forward route segments, at the route segment penalty cost calculation step, the penalty costs for the forward route segments of the original route and of the trial route are calculated by substituting the arrival times at the transit points P3 along the original route and along the trial route into the arrival time variables t for the dynamic penalty functions for the transit points P3; and at the route evaluation step, the original route and the trial route are evaluated based on the comparison of the penalty costs for the forward route segments of the original route and of the trial route.

According to a seventeenth aspect of the invention, the route search method of the sixteenth aspect further comprises:

a time offset holding step, wherein, as an arrival time, a time offset is employed that is represented by an offset, held at the time offset holding step, from a reference time Tb, and wherein, when the total cost CT of the trial route is smaller than the total cost CT of the original route, and each time the original route is updated to a trial route, at the time offset holding step, the reference time Tb is updated based on a change L__reduce for the time re-calculation length of the updated route.

According to an eighteenth aspect of the invention, the route search method of the seventeenth aspect further comprises:

a first arrival time offset calculation step, of calculating an arrival time offset a that, through inverse propagation initiated at the last transit point Pz, is set for each transit point along a route, wherein, when an arbitrary transit point is defined as P1 and an immediately succeeding transit point in the direction of travel is defined as P2, at the first arrival time offset calculation step, an arrival time offset a_P1 for the transit point P1 is calculated based on the results obtained by subtracting from an arrival time offset a_P2 for the transit point P2, the sum of the time d(P1, P2) for the travel between P1 and P2, and a working time w_P1 for the transit point P1, and wherein an arrival time that is to be used at the dynamic penalty function addition step for calculating an arrival time difference is the arrival time offset a, which is obtained at the first arrival time offset calculation step.

According to a nineteenth aspect of the invention, the route search method of the eighteenth aspect further comprises:

a second arrival time offset calculation step, wherein it is ascertained that the arrival time offset a is changed at all the transit points along the trial route from a point whereat a target route segment to be changed is inserted or extracted, wherein the preceding transit point along the first target route segment to be changed on the original route in the direction of travel is defined as P0, wherein, at the second arrival time offset calculation step, an arrival time offset a_i at a transit point i is calculated using an arrival time offset a_P0 at P0 along a trial route in the direction of travel, wherein, when an arbitrary transit point is defined as P1 and an immediately succeeding transit point in the direction of travel is defined as P2, at the second arrival time offset calculation step, an arrival time offset a_P2 at the transit point P2 is calculated based on the results obtained by adding an arrival time offset a_P1, at the transit point P1, to the sum of a working time w_P1 for P1, and time d(P1, P2) for the travel between P1 and P2, wherein, at the route segment penalty cost calculation step, an arrival time, which is to be substituted into t in the dynamic penalty function for the route segment obtained at the route segment dynamic penalty function calculation step, is determined as the time obtained by adding the reference time Tb to the arrival time offset a, that is obtained at the second arrival time offset calculation step for the first transit point along the route segment.

According to a twentieth aspect of the invention, the route search method of the nineteenth aspect further comprises:

a first dynamic earliest arrival time calculation step of calculating, through inverse propagation originating at the last transit point Pz, a dynamic earliest arrival time E that is correlated with a static earliest arrival time e that is set for each transit point along a route to inhibit an arrival earlier than the static earliest arrival time e, wherein, when an arbitrary transit point is defined as P1 and the immediately succeeding transit point in the direction of travel is defined as P2, at the first dynamic earliest arrival time calculation step, which is the later time, either a static earliest arrival time e_P1 for P1, or the value obtained by subtracting from a dynamic earliest arrival time E_P2 for P2, the sum of a work time w_P1 for P1 and a time d(P1, P2) for the travel between P1 and P2, is determined as the dynamic earliest arrival time E for P1, wherein, when the time obtained by adding the reference time Tb to the arrival time offset a, which is obtained for the forward route segment of the trial route at the first arrival time offset calculation step, is earlier than the dynamic earliest arrival time E for the forward route segment, which is obtained at the first dynamic earliest arrival time calculation step, the calculation of a penalty cost for the forward route segment of the trial route is halted at the penalty cost calculation step.

According to a twenty-first aspect of the invention, the route search method of the twentieth aspect further comprises:

a second dynamic earliest arrival time calculation step of calculating the dynamic earliest arrival time E for a target route segment to be changed, wherein, when the first and the last transit points along the target route segment to be changed are called P1 and P2 (P2=P1 may be established), at the second dynamic earliest arrival time calculation step, a later time, either the static earliest arrival time e_P1 for P1, or a value obtained by subtracting, from the static earliest arrival time e_P2 for P2, the difference between a_P2 and a_P1, which are arrival time offsets for P2 and P1 obtained at the first arrival time offset calculation step, is determined as the dynamic earliest arrival time E for the target route segment to be changed, and wherein, when the time value obtained by adding the reference time Tb to the arrival time offset a, which is calculated at the first or second arrival time offset calculation step for the target route segment to be changed on the trial route, precedes the dynamic earliest arrival time E for the target route segment to be changed that is obtained at the second dynamic earliest arrival time calculation step, the calculation of the penalty cost for the target route segment to be changed on the trial route is halted at the penalty cost calculation step.

According to a twenty-second aspect of the invention, the route search method of the twenty-first aspect further comprises:

a first dynamic latest arrival time calculation step of calculating, through inverse propagation originating at the last transit point Pz, a dynamic latest arrival time L that is correlated with a static latest arrival time 1 that is set for each transit point along a route to inhibit an arrival later than the static latest arrival time 1, wherein, when an arbitrary transit point is defined as P1 and the immediately succeeding transit point in the direction of travel is defined as P2, at the first dynamic latest arrival time calculation step, an earlier time, either a static latest arrival time 1_P1 for P1, or the value obtained by subtracting from a dynamic latest arrival time L_P2 for P2, the sum of a work time w_P1 for P1 and a time d(P1, P2) for the travel between P1 and P2, is determined as the dynamic latest arrival time L for P1, and wherein, when the time obtained by adding the reference time Tb to the arrival time offset a, which is obtained for the forward route segment of the trial route at the first arrival time offset calculation step, is later than the dynamic latest arrival time L for the forward route segment, which is obtained at the first dynamic latest arrival time calculation step, the calculation of a penalty cost for the forward route segment of the trial route is halted at the penalty cost calculation step.

According to a twenty-third aspect of the invention, the route search method of the twenty-second aspect further comprises:

a second dynamic latest arrival time calculation step, of calculating the dynamic latest arrival time L for a target route segment to be changed, wherein, when the first and the last transit points along the target route segment to be changed are called P1 and P2 (P2=P1 may be established), at the second dynamic latest arrival time calculation step, which is the earlier time, the static latest arrival time 1_P1 for P1, or a value obtained by subtracting from the static latest arrival time 1_P2 for P2, the difference between a_P2 and a_P1, which are arrival time offsets for P2 and P1 obtained at the first arrival time offset calculation step, is determined as the dynamic latest arrival time L for the target route segment to be changed, and wherein, when the time value obtained by adding the reference time Tb to the arrival time offset a, which is calculated at the first or second arrival time offset calculation step for the target route segment to be changed on the trial route, precedes the dynamic latest arrival time L for the target route segment to be changed that is obtained at the second dynamic latest arrival time calculation step, the calculation of the penalty cost for the target route segment to be changed on the trial route is halted at the penalty cost calculation step.

According to a twenty-fourth aspect, the route search method of the twenty-third aspect further comprises:

a first dynamic length calculation step of calculating a dynamic length W, which is correlated with each transit point along a route, through inverse propagation originating at the last transit point Pz;

an arrival time offset validity determination step; and a second dynamic length calculation step, wherein, when an arbitrary transit point is defined as P1 and the immediately succeeding transit point in the direction of travel is defined as P2, at the first dynamic length calculation step, a value based on the results obtained by adding a dynamic length W_P2 for P2, to the sum of the travel time between P1 and P2 and a working time for P1, is determined as a dynamic length W_P1 for P1, wherein, when it is ascertained at the arrival time offset validity determination step that arrival time offsets for transit points following P1 along the original route are valid, and when the first and last transit points along the target route segment to be changed are called P1 and P2 (P2=P1 may be established) and the succeeding transit point, following P2, along the original route in the direction of travel is called P3, at the second dynamic length calculation step, the dynamic length W for the target route segment is obtained by subtracting from a dynamic length W_P1 for P1, the sum of a dynamic length W_P3 for P3, and the travel time between P2 and P3, wherein, when a dynamic length for the target route segment obtained at the second dynamic length calculation step is defined as W, at the second arrival time offset calculation step, an arrival time offset of a_P3 for P3 is calculated based on the results obtained by adding an arrival time offset a_P1 for P1, to the sum of the dynamic length W and the travel time between P2 and P3.

According to a twenty-fifth aspect of the invention, the route search method of the twenty-fourth aspect further comprises:

a rank provision step of providing ranks, in descending order in the direction of travel, for transit points along a route;

a rank storage step of, when the propagation of the dynamic penalty function is initiated at the dynamic penalty function addition step, storing the ranks at the foremost transit point from a transit point that has been propagated, wherein, when a transit point has a rank value equal to or smaller than a value stored at the rank storage step, it is ascertained at the dynamic penalty function validity determination step that a dynamic penalty function for the transit point is valid, and wherein, when the original route is updated to a trial route, and when P0 and P3 denote transit points in the inverse direction of travel and in the forward direction of travel from a point on the updated route whereat a target route segment to be changed is inserted, at the rank provision step, intermediate ranks between the rank for P0 and the rank for P3 are provided for the individual transit points in the descending order in the direction of travel along the target route segment to be changed on the updated route.

According to a twenty-sixth aspect of the invention, in the route search method of the twenty-fifth aspect, the inverse propagation, at the individual steps, of the dynamic penalty function F, the dynamic earliest arrival time E, the dynamic latest arrival time L and the dynamic length W occurs simultaneously, and the dynamic penalty function validity determination step also serves as a step of determining whether the dynamic earliest arrival time E, the dynamic latest arrival time L and the dynamic length W for each transit point are valid.

According to a twenty-seventh aspect of the invention, the route search method of the twenty-sixth aspect further comprises:

a transit point pointer setting step of, when inverse propagation of the dynamic penalty function F, the dynamic earliest arrival time E, the dynamic latest arrival time L and the dynamic length W is employed, setting a transit pointer at the foremost transit point from a transit point that has been inversely propagated, wherein the contents of the transit point pointer are updated, so that the transit point pointer designates as the next transit point a transit point that, in the direction of travel, is adjacent to the last target route segment to be changed on the updated route, and wherein inverse propagation is next employed for the dynamic penalty function F, the dynamic earliest arrival time E, the dynamic latest arrival time L and the dynamic length W, beginning at a transit point preceding the transit point pointed at by the transit point pointer.

According to a twenty-eighth aspect of the invention, in the route search method of the fifteenth aspect, changes effected for a route segment of a route includes the movement and the deletion of a route segment and the insertion of the route segment into another predetermined location in another route.

Figure 10:
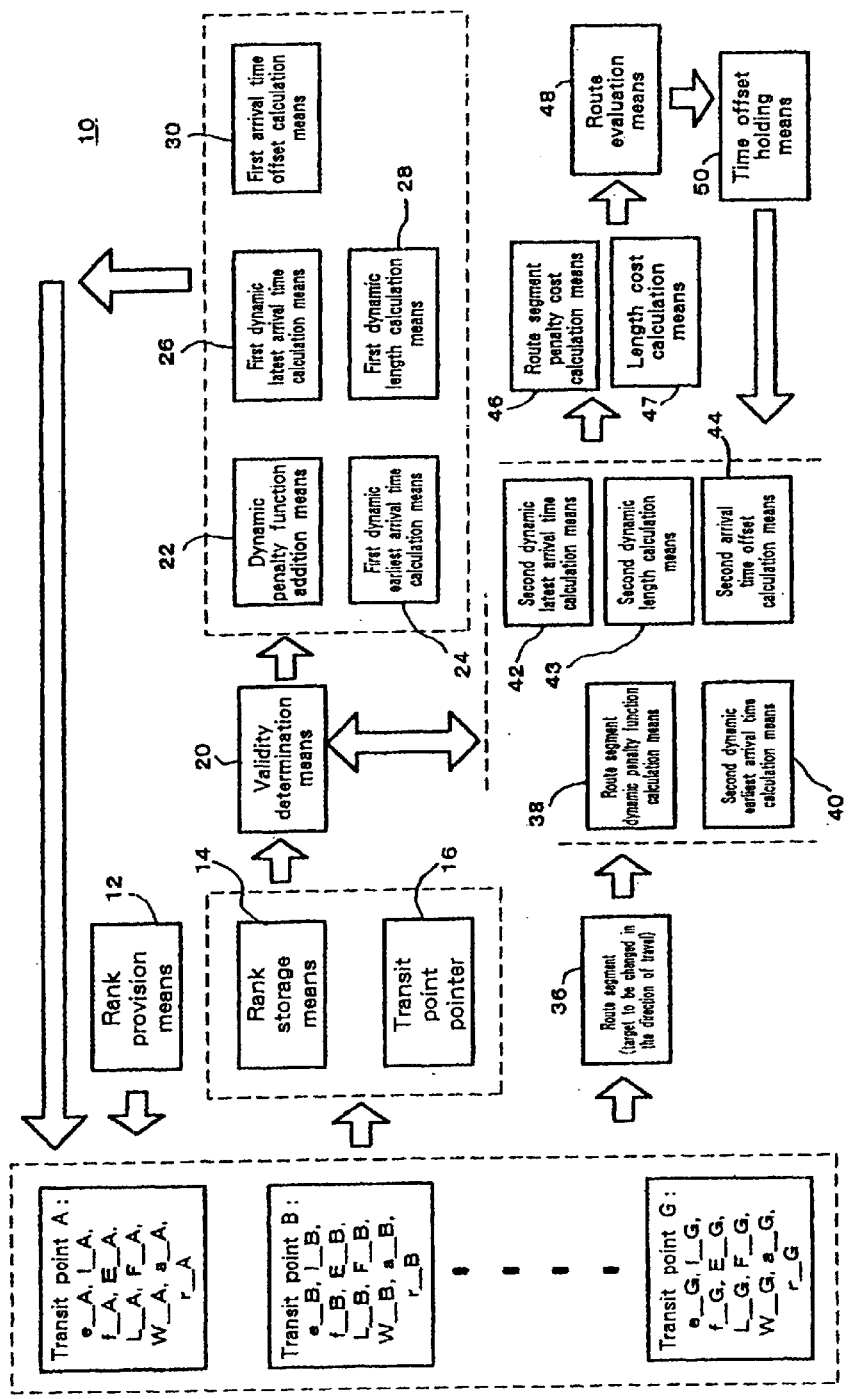
FIG. 10 is a functional block diagram showing a route search system.

FIG. 10 is a functional block diagram showing a route search system 10. Transit points A to G are arranged in alphabetical order to form an original route. Each transit point is correlated with a static earliest arrival time e, a static latest arrival time 1, a static penalty function f, a dynamic earliest arrival time E, a dynamic latest arrival time L, a dynamic penalty function F, a dynamic length W, an arrival time offset a and a rank r. The static earliest arrival time e, the static latest arrival time 1 and the static penalty function f are fixed and do not fluctuate, while the dynamic earliest arrival time E, the dynamic latest arrival time L, the dynamic penalty function F, the dynamic length W, the arrival time offset a and the rank r are updated as needed. Rank provision means 12 provides ranks for the individual transit points along the route in the descending order in the direction of travel. When dynamic penalty function addition means 22, first dynamic earliest arrival time calculation means 24, first dynamic latest arrival time calculation means 26, first dynamic length calculation means 28 and first arrival time offset calculation means 30 complete the inverse propagation, from transit points G to A, of the dynamic earliest arrival time E, the dynamic latest arrival time L, the dynamic penalty function F, the dynamic length W and the arrival time offset a, rank storage means 14 stores the rank of the preceding transit point (point A in FIG. 10). Further, when the dynamic penalty function addition means 22, the first dynamic earliest arrival time calculation means 24, the first dynamic latest arrival time calculation means 26, the first dynamic length calculation means 28 and the first arrival time offset calculation means 30 complete the inverse propagation, from the transit points G to A, of the dynamic earliest arrival time E, the dynamic latest arrival time L, the dynamic penalty function F, the dynamic length W and the arrival time offset a, a transit point pointer 16 stores the foremost transit point (point A in FIG. 10) among the processed transit points. Then, when the total cost for a trial route is lower than that for the original route, and when the route is updated to the trial route, the contents of the transit point pointer 16 are updated to point to the succeeding transit point along the last target route segment to be changed on the updated route in the direction of travel. When the rank r for a transit point is equal to or smaller than a value stored in the rank storage means 14, validity determination means 20 ascertains that the dynamic earliest arrival time E, the dynamic latest arrival time L, the dynamic penalty function F, the dynamic length W and the arrival time offset a for the pertinent transit point are valid. Conversely, when the rank r for a transit point is greater than a value stored in the rank storage means 14, validity determination means 20 ascertains that the dynamic earliest arrival time E, the dynamic latest arrival time L, the dynamic penalty function F, the dynamic length W and the arrival time offset a for the pertinent transit point are invalid. When the validity determination means 20 ascertains that a transit point has an invalid dynamic penalty function, which is related to the calculation process performed by route segment dynamic penalty function calculation means 38 and others, the validity determination means 20 transmits re-calculation instructions to the dynamic penalty function addition means 22 and others. Upon the receipt of the re-calculation instructions, the dynamic penalty function addition means 22, the first dynamic earliest arrival time calculation means 24, the first dynamic latest arrival time calculation means 26, the first dynamic length calculation means 28 and the first arrival time offset calculation means 30 calculate anew the dynamic penalty function F, the dynamic earliest arrival time E, the dynamic latest arrival time L, the dynamic length W and the arrival time offset a for the individual transit points through inverse propagation beginning at the transit point, in the direction of travel, preceding the transit point pointed to by the transit point pointer 16. When the validity determination means 20 ascertains that the dynamic penalty function for a transit point related to calculations performed for a route segment 36 is valid, route segment dynamic penalty function calculation means 38, second dynamic earliest arrival time calculation means 40, second dynamic latest arrival time calculation means 42, second dynamic length calculation means 43 and second arrival time offset calculation means 44 calculate the dynamic penalty function F, the dynamic earliest arrival time E, the dynamic latest arrival time L and the dynamic length W for the route segment 36. For the route segments that are affected as the target route segment 36 is changed (as will be described later, for a trial route A→D→B→C→E→F→G that is obtained by exchanging target route segment to be changed B→C with D in the original route, the route segments whose arrival times are affected are the target route segments B→C and D that were changed and the forward route segment E→F→G), the arrival time offset at the foremost transit point of each route segment is compared with the dynamic earliest arrival time E and the dynamic latest arrival time L, which are respectively obtained by the second dynamic earliest arrival time calculation means 40 and the second dynamic latest arrival time calculation means 42. When the arrival time offset is earlier than the dynamic earliest arrival time E or later than the dynamic latest arrival time L, it is assumed that changing the route segment was inappropriate, and the route segment dynamic penalty function calculation means 38 performs no calculations. Only when the arrival time offset at each transit point, which is provided by the second arrival time offset calculation means 44, falls into a range extending from the dynamic earliest arrival time E to the dynamic latest arrival time L, does the route segment dynamic penalty function calculation means 38 calculate the dynamic penalty function F for the route segment 36, and the route segment penalty cost calculation means 46 calculate the cost for the route segment 36 by substituting the arrival time offset, which is obtained for the foremost transit point on the route segment 36 by the second arrival time offset calculation means 44, into the arrival time variable t of the dynamic penalty function, which is produced by the route segment dynamic penalty function calculation means 38. Route evaluation means 48 evaluates the trial route based on the value produced by the route segment penalty cost calculation means 46. When the cost required for the trial route is lower than the cost required for the original route, the original route is updated to the trial route, and the value held by time offset holding means 50 is decremented a value equivalent to the reduction in the time length produced by the re-calculation for the updated route.

Figure 11:
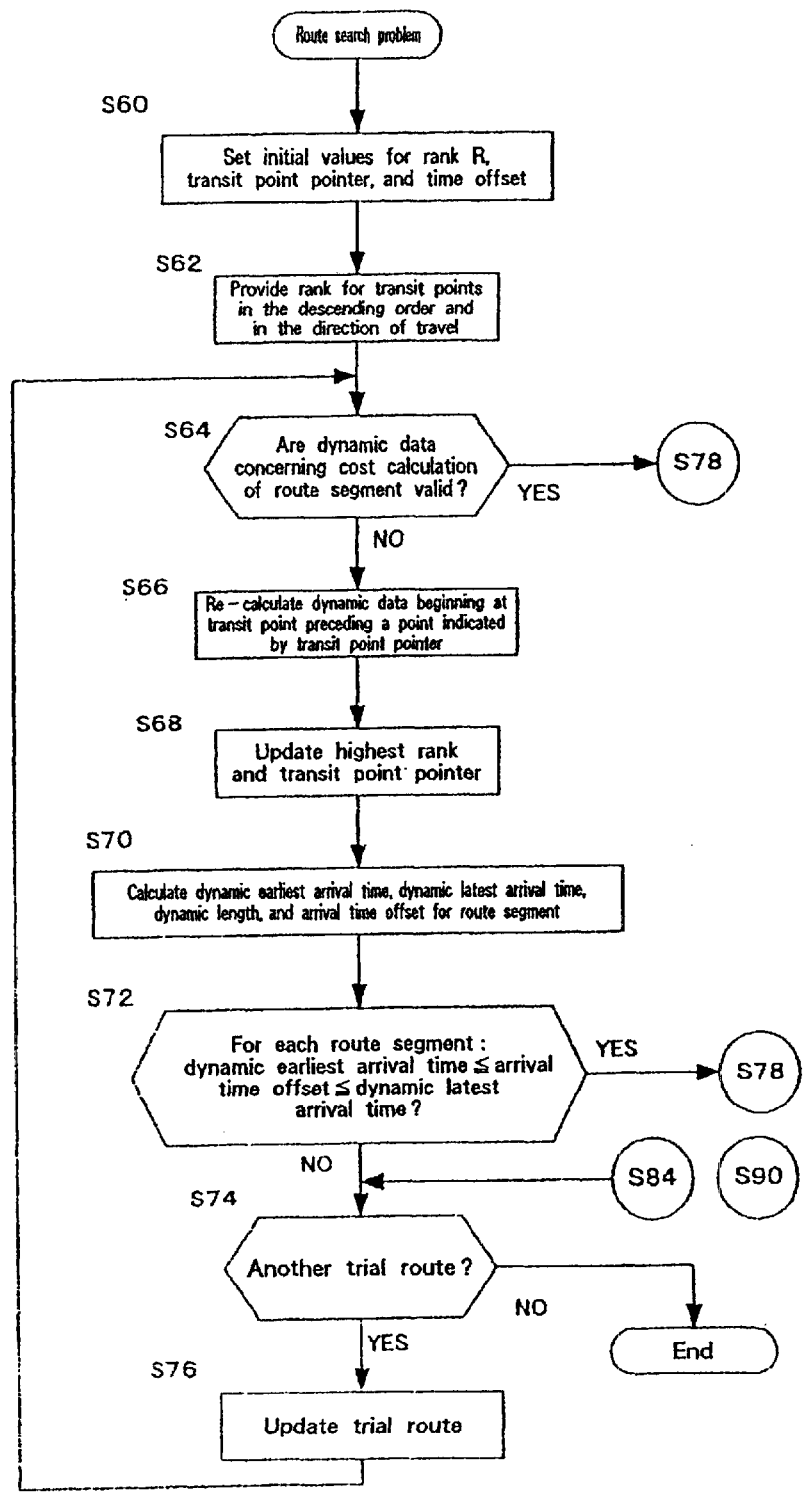
FIG. 11 is a flowchart for the first portion of a program for the application of the route search system.
Figure 12:
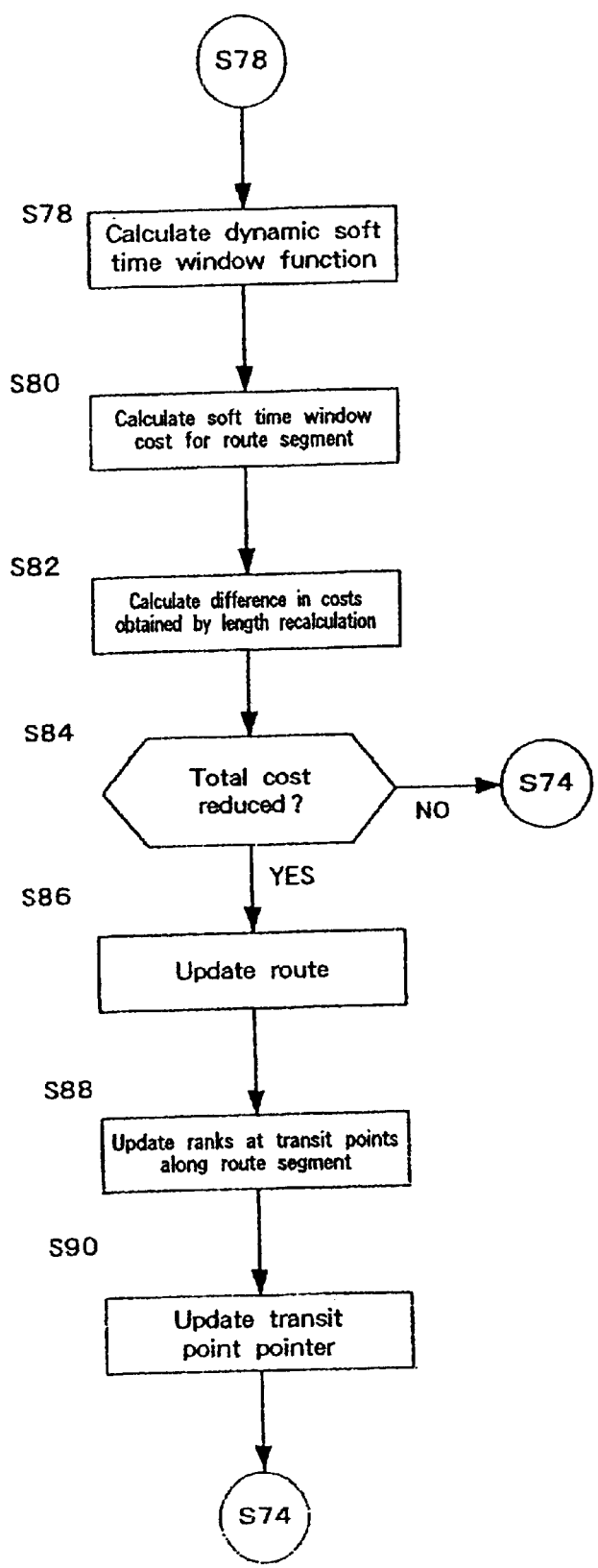
FIG. 12 is a flowchart for the second portion of the program for the application of the route search system.

FIGS. 11 and 12 are flowcharts for a program for implementing the functions of the route search system 10. First, the initial values are entered as a rank R, a transit point pointer and a time offset (S60). The initial values of the rank R, the transit point pointer and the time offset are, for example, −1, NULL or any other arbitrary value. Then, a rank is provided, in the descending order, for the transit points along a route in the direction of travel (S62). Following this, a check is performed to determine whether dynamic data used for the calculation of the cost required for a route segment, such as a target route segment to be changed, i.e., the dynamic earliest arrival time E, the dynamic latest arrival time L, the dynamic penalty function F, the dynamic length W and the arrival time offset a, are valid (S64). If these dynamic data are valid, program control advances to S78, whereas if the dynamic data are not valid, program control is shifted to S66. At S66, the dynamic data are re-calculated through inverse propagation originating at the transit point preceding the transit point (the foremost transit point among those whose dynamic data are valid) pointed at by the transit point pointer in the forward direction. When the inversely propagated re-calculations have been completed, the foremost transit point (e.g., transit point A) of the transit points for which the dynamic data were re-calculated is registered in the transit point pointer, and for the pertinent transit point the highest rank is registered (S68). At S70, the dynamic earliest arrival time E, the dynamic latest arrival time L, the dynamic length W and the arrival time offset a are calculated for the target route segment. At S72, based on the dynamic data obtained at S70, a check is performed to determine the dynamic arrival time for each transit point falling within the range extending from the dynamic earliest arrival time E to the dynamic latest arrival time L. When the decision at S72 is YES, program control advances to S78, or when the decision is NO, program control is shifted to S74. At S74, a check is performed to determine whether there is another trial route. When no other trial route is found, the processing is terminated, but if another trial route is found, at S76 the trial route is updated to the pertinent trial route, and program control returns to S64.

At S78, the dynamic penalty function is calculated for the route segment. At S80, the penalty cost is calculated by substituting the arrival time offset a, obtained at S70, into the arrival time variable t of the dynamic penalty function obtained at S78. At S82, the difference between the length cost of the trial route and that of the original route is calculated. At S84, the penalty costs and the length costs of the route segments of the original route and the trial route are employed to determine whether the total cost for the trial route is smaller than the total cost for the original route. If the total cost for the trial route is reduced, program control advances to S86. If the total cost for the trial route is not reduced, program control is shifted to S74. At S86, the original route is updated to the trial route. Thus, the trial route is thereafter employed as the original route for the processing. At S88, the rank provided for each transit point on the inserted route segment is updated. When the transit points in the inverse and forward directions of travel from the point whereat the route segment is inserted into the updated route are defined as P0 and P3, the ranks for the transit points on the inserted route segment are set as intermediate values, lying between the rank for P0 and the rank for P3, and in the descending order in the direction of travel. At S90, the transit point pointer 16 is updated, while the transit point pointer 16, which points at the foremost of the transit points for the forward route segment on the updated route, is unchanged. Thereafter, program control is shifted to S74.

DETAILED DESCRIPTION OF THE PREFERRED EMBODIMENT

The preferred embodiment of the invention will now be described.

Figure 4:
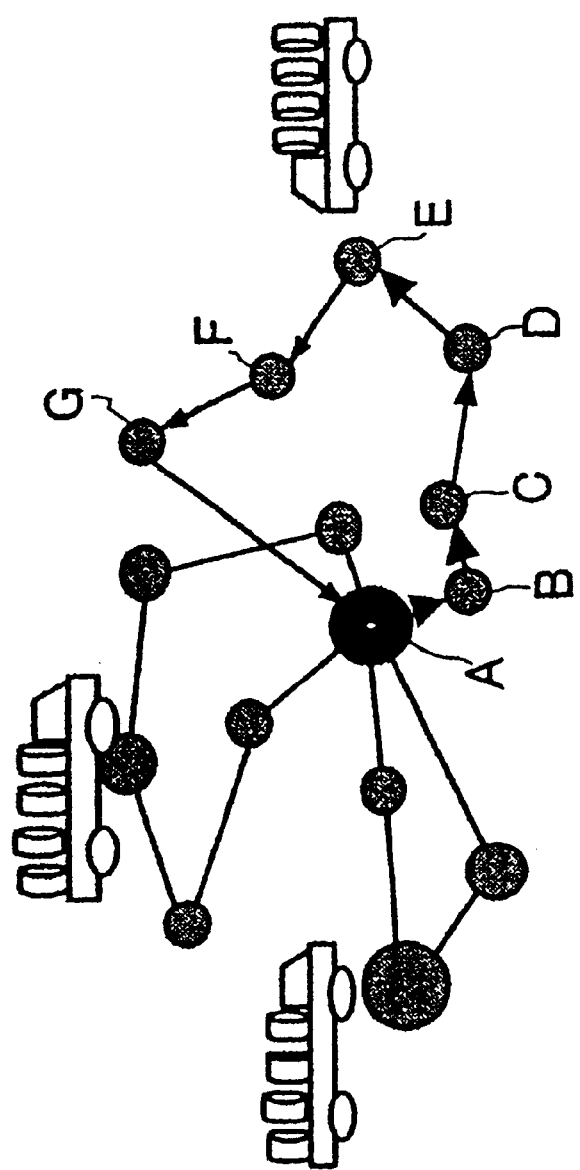
FIG. 4 is a diagram showing a predetermined route along which a truck travels, and the transit points along the route.
Figure 5:
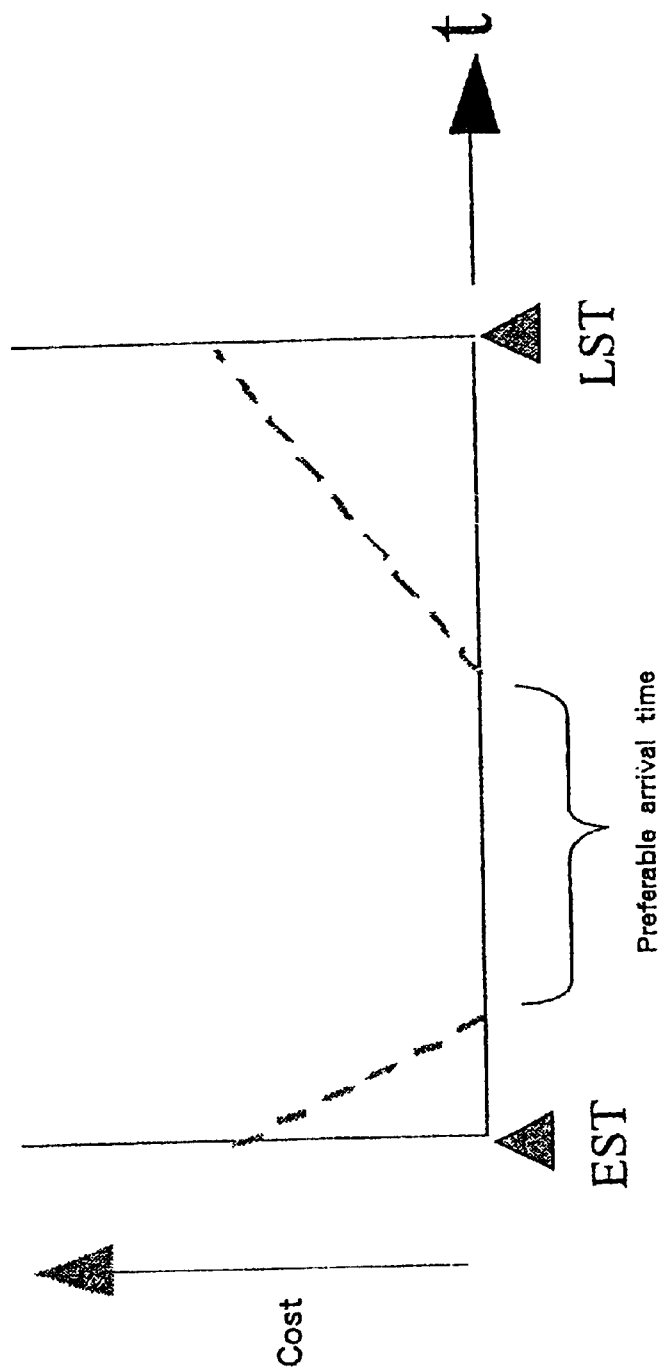
FIG. 5 is a diagram showing a static soft time window function, indicated by a broken line, at a predetermined transit point.

FIG. 4 is a diagram showing a predetermined route along which a truck circulates and its transit points. Along the predetermined route, the truck travels to transit points A→B→C→D→E→F→G→A. In FIG. 5, the static soft time window function at a predetermined transit point is indicated by a broken line. The EST (Earliest Start Time) and the LST (Latest Start Time) represent the static earliest arrival times and the static latest arrival times for the individual transit points. The arrival time can be set to a preferable range by setting the static soft time window function.

Figure 6:
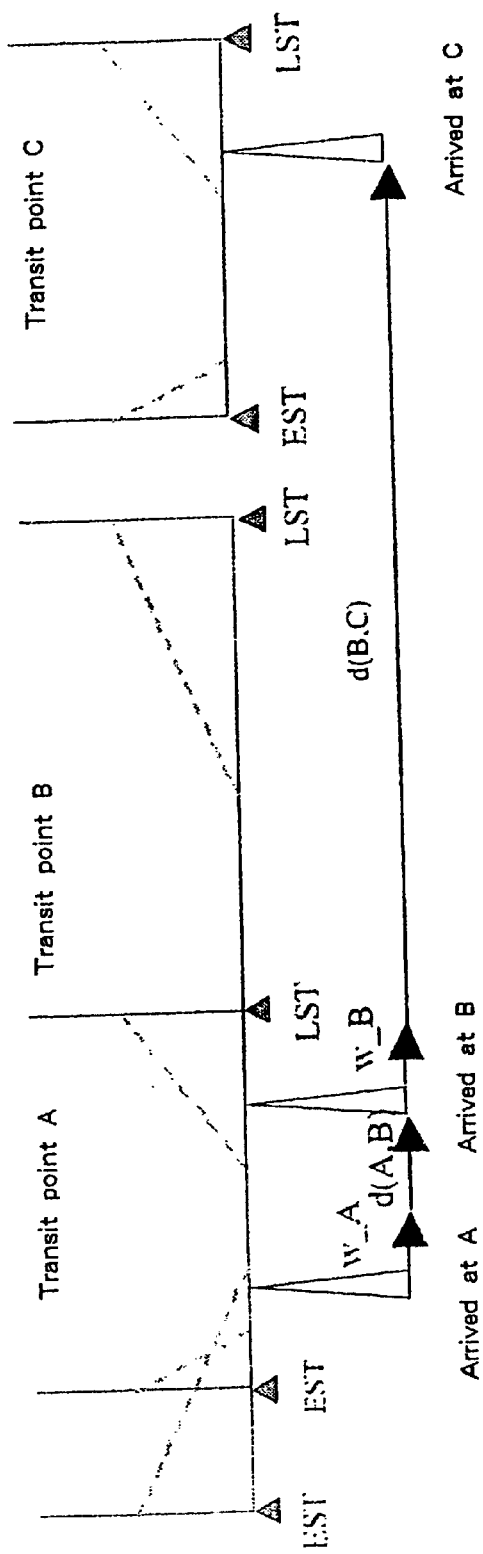
FIG. 6 is a diagram showing the length obtained by the re-calculation of the time and the static soft time window function for each transit point visited as a truck travels along a delivery route.

FIG. 6 is a diagram showing the length for time re-calculation, and the static soft time window function for each of the transit points when a truck moves between them. As is shown in FIG. 6, the time windows for the transit points A and B may overlap, and the route choices include both A→B→C and B→A→C. $w\_A$ and $w\_B$ represent the work times for transit points A and B, while $d(A, B)$ and $d(B, C)$ are the required travel times between A and B and between B and C. To determine for which route, A→B→C or B→A→C, the cost is the smallest, the total of the costs provided by re-calculation of the lengths of the routes and the sum of the soft time window costs related to the arrival times at the individual transit points must be calculated. According to the conventional calculation method, the costs are calculated independently for the route A→B→C and for the route B→A→C, so that time and labor in proportion to the number of transit points (and the number of linear segments) are required.

Figure 7:
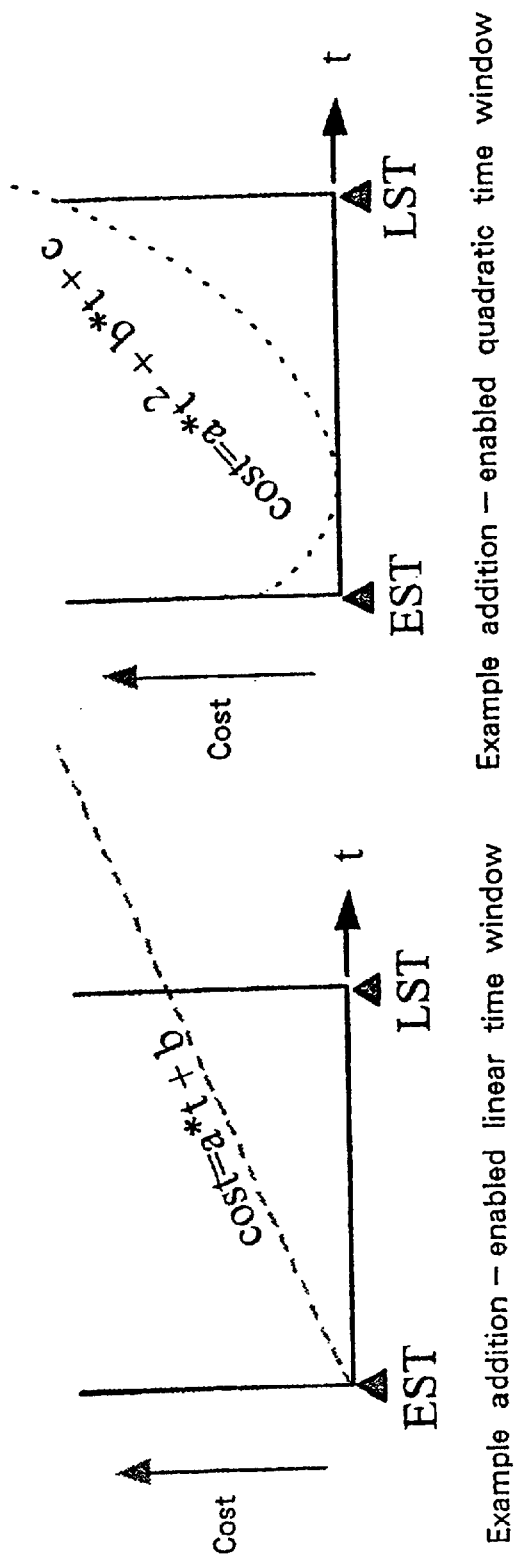
FIG. 7 is a diagram showing a soft time window for which addition is enabled.

FIG. 7 is a diagram showing addition-enabled soft time windows. One of the soft time windows is linear and the other soft time window is quadratic. As is shown in this example, when a soft time window is expressed as a polynomial equation, the time windows of multiple transit points can be added together, and the cost calculation can be efficiently performed. In FIG. 7, the EST is not the origin t=0, and is rather, a value of t≧0. For the linear soft time window, the cost at EST is 0, and in this case, $b=-a*EST$.

Figure 8:
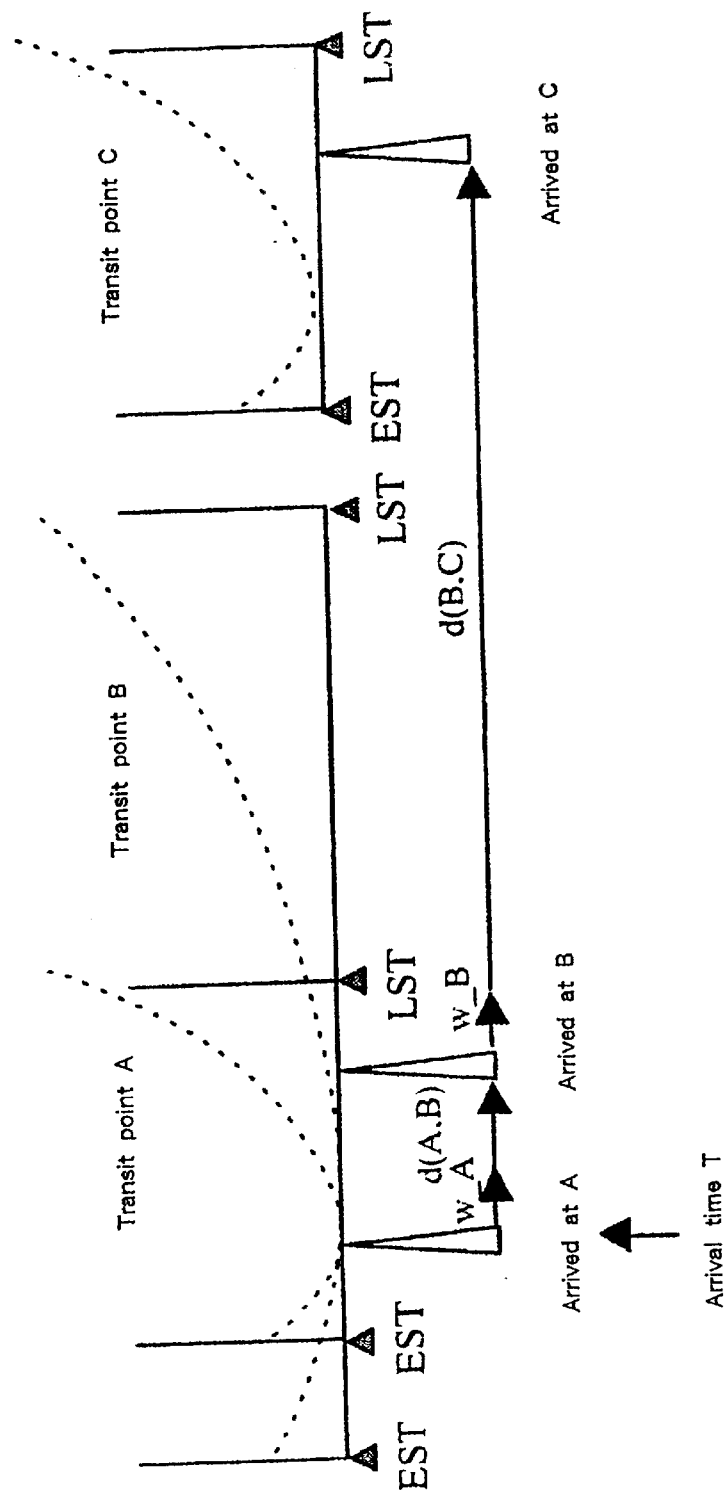
FIG. 8 is a diagram showing the length obtained by the re-calculation of the time and the static soft time window function when the static soft time window function of each transit point is a quadratic equation.

FIG. 8 is a diagram showing a quadratic static soft time window function for each transit point and the length obtained by recalculating the time required for moving the transit point. It should be noted that hereinafter the route segment includes at least one transit point, and is also called a path, as needed. When the arrival time at path A→B→C is T (the arrival time at the path is defined as the arrival time at the first transit point on the path, and in this case, the arrival time at the path is the arrival time at the transit point A), the soft time window cost calculation for this path can be performed by the evaluation of one polynomial equation. It should be noted that each polynomial equation corresponding to the soft time window is a static curve along the time axis t, and does not depend on the arrival time. That is, the same three curves in FIG. 8 are employed for either route A→B→C or route B→A→C. As will be described later, it should be noted that the polynomial equation obtained through addition for A→B→C differs from the one for B→A→C.

Hereinafter, "^" denotes a power series, and "*" denotes multiplication, with ^2 meaning the power of 2. Assume that the soft window for the transit point A is defined as the quadratic polynomial equation $cost=Aa*t^2+Ab*t+Ac$, and similarly, for transit points B and C, $cost=Ba*t^2+Bb*t+Bc$ and $cost=Ca*t^2+Cb*t+Cc$. The polynomial for the soft time window of the path A→B is expressed as $cost=Aa*t^2+Ab*t+Ac+Ba*(t+w\_A+d(A, B))^2+Bb*(t+w\_A+d(A, B))+Bc$. That is, when the arrival time at A is t, the truck arrives at B at the time $(t+w\_A+d(A, B))$, where $w\_A$ is the working time at A and $d(A, B)$ is the time required to travel between A and B. Assuming that $u=w\_A+d(A, B)$, $cost=(Aa+Ba)*t^2+(Ab+Bb+2*Ba*u)*t+(Ac+Bc+Ba*u^2+Bb*u)$ is obtained, and since this is also a quadratic polynomial equation, it is represented by three coefficients.

Similarly, the polynomial equation for the soft time window for the path A→B→C is represented as $cost=Aa*t^2+$ $Ab*t+Ac+Ba*(t+w\_A+d(A, B))^2+Bb*(t+w\_A+d(A, B))+Bc+Ca*(t+w\_A+d(A, B)+w\_B+d(B, C))A2+Cb*(t+w\_A+d(A,B)+w\_B+d(B,C))+Cc$. That is, when the arrival time at A is t, the truck arrives at B at the time $(t+w\_A+d(A, B))$, and arrives at C at the time $(t+w\_A+d(A, B)+w\_B+d(B, C))$, where w_B is the working time at B. Since this is also a quadratic polynomial equation, this is also represented by three coefficients.

As is described above, the soft time window set for each transit point is defined for a path. As a result, as will be described later, the cost calculation can be rationalized for the change not only for a path including one transit point, but also for a path including multiple continuous transit points.

To exchange one part of the route, the cost must be calculated using the soft time window for each path for which the arrival time is shifted. According to this invention, the speed at which cost calculations are performed is increased (here, the path represents one transit path on the route or multiple continuous transit paths).

As an example, assuming that the transit points on a specific route are arranged in the order A→B→C→D→E→F→G as is shown in FIG. 4, an explanation will be given for an operation for moving path D (or an operation for exchanging path B→C with D) so it follows A to obtain the following route. A→D→B→C→E→F→G The path locations whereat the arrival times are changed are D, B→C, and E→F→G. Since the arrival time at A is not changed, this need not be counted. A check is then performed to determine whether this travel time satisfies the following conditions (1) and (2).

(1) The hard time windows for D, B→C and E→F→G (the time window for which only the EST and the LST are set and the cost between the EST and LST is not taken into account) are satisfied.

(2) The sum of the amount of reduction in the cost and the amount of reduction in the travel time relative to the soft time windows (the cost between the EST and LST is taken into account) D, B→C and E→F→G is a positive value.

When these conditions are satisfied, the route along which the truck travels satisfies the limitation, and its cost is lower than the cost required for the original route. In this determination process, since the number of intervals for which the travel time is changed is a constant, the labor required to calculate the amount of reduction achieved for the travel time in (2) is equivalent to that required for the constant. That is, in the above example, since the intervals for which the travel time is reduced are C→D, D→E and A→B, and the intervals for which the travel time is increased are A→D, D→B and C→E, when the travel time at the intervals is represented as d(C, D), the reduction in the travel time is $d(C, D)+d(D, E)+d(A, B)-d(A, D)-d(D, B)-d(C, E)$.

Whereas, (1) when the information obtained by the route evaluation is retained to minimize the labor required for tracking the path, the restriction of the hard time window can be efficiently determined simply in the order D, B→C and E→F→G. And similarly, (2) when the addition-enabled soft time window is employed to minimize the labor required for tracking the path, the cost calculation for the soft time window can be efficiently performed in the order D, B→C and E→F→G.

In addition to moving the transit point to a position preceding the path, a similar process can be performed to moving the transit point to a position following the path, or to a different route. That is, the number of paths for which the arrival times are changed is limited to the constant, and the same determination as in (1) and (2) must be performed for the path.

A method for efficiently performing the processes (1) and (2) will now be described. Hard time windows (EST and LST) and a soft time window (polynomial equation) and the length (time required at the transit point) are provided for each transit point. These data are called static data. The EST is the earliest arrival time at a transit point, and arrival before that time is not permitted. The LST is the latest arrival time at the pertinent transit point, and arrival after that time is not permitted. If the polynomial equation is linear, it includes an inclination a and a displacement b, and if the polynomial equation is quadratic, it includes the coefficients a, b and c of the terms (for the high-order equation, it also includes the coefficients of the terms). Further, the transit point is accompanied by the hard time windows (EST and LST), the soft time window (polynomial equation), the length (the time required for a path), the arrival time and the rank, all of which are related to all the transit points following the pertinent transit point on the route. These are called dynamic data. For the dynamic data for path A→B→C, for example, the length is the sum of the time d(A, B), for the travel between A and B, the time d(B, C), for the travel between B and C, and the working times at A, B and C, that when calculated yields a cost. The arrival time is the time of arrival at the first transit point on the route, and is a value offset from a specific base time. The rank is a value used to determine whether the dynamic data are valid, and is provided so as to be monotonically reduced along the route. A satisfactory margin is provided for the values awarded as ranks, so that the values need not be replaced when a transit point is inserted into the route. For example, for the route A→B→C→D→E→F→G, r_A=70000, r_B=60000, r_C=50000, r_D=40000, r_E=30000, r_F=20000 and r_G=10000.

The addition of data (either dynamic or static data) is defined as preparation. There are two data sets, INFO1 and INFO2, which can respectively be regarded as data for the transit points A and B in FIG. 8. In this case, INFO1 and INFO2 are each provided for one, individual transit point; however, INFO1 and INFO2 may be associated with a path that connects multiple continuous transit points. The difference between the first transit points for INFO1 and for INFO2 is defined as u, which includes the working time and the travel time for INFO1 and the travel time from INFO1 to INFO2. That is, in accordance with the time relationship, when the truck arrives at the first transit point for INFO1 at time t, it arrives at the first transit point for INFO2 at time t+u. Assume that the coefficients for INFO1 are a, b, c, . . . and the coefficients for INFO2 are A, B, C, . . . , while the information for the ESTs and the lengths for INFO1 and INFO2 are represented, for example, as EST1 and length 2 using the numbers 1 and 2.

The following process is performed to add these two data sets that are to be used as a single, dynamic data set. First, the EST is defined, as the maximum value, either as EST1 or EST2-u. Since there are only two elements to be compared, the maximum value here is a greater value. Further, since it is assumed that the time increases from the past to the future, at the later time the value is greater. The LST is defined as the minimum value, either LST1 or LST2-u. Since there are also only two elements to be compared, the minimum value is a small value, while the value for the earlier time is smaller. For the linear polynomial equation, the equation for INFO2, $y=A*(t+u)+B$, is added to the equation for INFO1, $y=a*t+b$, i.e., $y=(a+A)*t+b+Au+B$ is obtained, while for the quadratic polynomial equation, the equation for INFO2, $y=A*(t+u)^2+B*(t+u)+C$, is added to the equation for INFO1, $y=a*t^2+b*t+c$, i.e., $y=(a+A)*t^2+(b+2Au+B)*t+c+Au^2+Bu+C$ is obtained. The same process is performed for the higher-order polynomial equation, and the length obtained is (u+length2). It should be noted that for the evaluation of the route the time is re-calculated to obtain the cost, and the same arrival time as for INFO1 is employed. The dynamic data that is generated for the path when the path for INFO2 is connected, following the path for INFO1, is obtained through the above described addition process.

The subtraction of dynamic data will now be defined. As for addition, assume that there are two dynamic data sets, INFO1 and INFO2, and that INFO2 is the second half of the INFO1, and that the time difference between the first transit points for INFO1 and INFO2 is denoted by u. Further, assume that the first transit points for INFO1 and INFO2 are defined as P1 and P2, that the succeeding transit point from INFO2, in the forward direction, is Pe, and that the travel time between Pe and P2 is defined as d(Pe, P2). At this time, the following process is performed to remove the portion INFO2 from INFO1, and to obtain only the dynamic data for the first half (path P1 to Pe) of INFO1. First, while the EST can not actually be obtained unless the first half of INFO1 is scanned, this operation is performed later, and the maximum value, either EST1 or ESTe-v, is used as a lower limit. In this case, ESTe is the EST at Pe, and V=u−w_Pe−d(Pe, P2) and w_Pe is the work time at Pe. That is, v is the difference between the arrival times at the first and the last transit points for INFO1. As well as the EST, the LST can not be obtained unless the first half of INFO1 is scanned, and the minimum value, either LST1 or LSTe-v, is used as the upper limit value. In short, the correct EST and LST may be stricter than these values, and LSTe is the LST at Pe. For the linear polynomial equation, the equation for INFO2, $y=A*(t+u)+B$, is subtracted from the equation for INFO1, $y=a*t+b$, i.e., $y=(a-A)*t+b\ Au-B$ is obtained. While for the quadratic polynomial equation, the equation for INFO2, $y=A*(t+u)^2+B*(t+u)+C$, is subtracted from the equation for INFO1, $y=a*t^2+b*t+c$, i.e., $y=(a-A)*t^2+(b-2Au-B)+c-Au^2-Bu-C$ is obtained. Subsequently, the same process is performed for the higher-order polynomial equation, and the length of the path following the subtraction is u−d(Pe, P2). That is, when the path for INFO1 is A→B→C→D→E→F→G and the path for INFO2 is E→F→G, P1=A, Pe=D and P2=E are established and u is the length (the time required) from A to E. However, the time d(D, E) for traveling from D to E is not included in the length of the first half A→B→C→D for INFO1, i.e., u−d(D, E). Through this processing, the length of the path generated by subtracting INFO2 from INFO1 is the sum of the work time for all the transit points on the path obtained by subtraction and the travel time between the adjacent transit points on the path obtained by subtraction, while the time required for traveling between the last transit point on the path obtained by subtraction and the first transit point for INFO2 is removed. The arrival time on the path obtained by subtraction is regarded as being the same as that for INFO1, and when the path for INFO2 equals the path leading from the first transit point for INFO1 to a predetermined intermediate transit point, the path for INFO2 is deleted from the path for INFO1 and the dynamic data for the resultant path can be obtained by performing the above described subtraction.

When the defined addition and subtraction are employed for the data, the dynamic data can be set in advance for each transit point, and the hard time window and the soft time window for a path for which the arrival time has been changed can be efficiently evaluated.

An explanation will now be given for a method for setting dynamic data for the following path by employing the above example path, A→B→C→D→E→F→G. When the dynamic data following D must be examined, at a specific point, inverse scanning of the route is initiated and inverse propagation is employed to correlate the dynamic data for each transit point with the pertinent transit point, so that the data obtained by adding together static data for G and F is stored in correlation with F (as dynamic data), and the data obtained by adding together the data for F and the static data for E is correlated with E (as dynamic data), since the labor effort required is in proportion to the number of transit points if the static data for G+ the static data for F+ . . . + the static data for D is calculated. After the dynamic data have been stored, the ranks for the transit points are also stored, and the first valid transit point, one for which "the dynamic data held by the rank time offset holding means for transit points having a rank equal to or less than 50000 are valid" holds true, is recorded for reference. Then, when the dynamic data for the transit points following D must be examined, and when the dynamic data for D are determined to be valid in accordance with the stored rank, only the dynamic data for D need be referred to. However, if the dynamic data for D are invalid, the required dynamic data are obtained by adding the data for the first valid transit point or for the first transit point along the inverse path to D (toward the first transit point in the inverse direction of travel).

In one instance, the arrival time for a specific transit point must be known during the search. In this case, when the arrival time is stored as a value offset from a base, the process for the inverse direction tracking of the transit points is not required. Further, the arrival times along a path succeeding a specific transit point in the direction of travel can be changed (e.g., all arrival times for the path D→E→F→G may earlier be shifted a time xx) merely by changing the base time. When this change operation is performed for a specific path, all arrival time data for preceding transit points along the path are rendered invalid, so that, in accordance with rank, the first valid transit point is stored for reference.

When the route has been changed, the rank for the transit point that is exchanged must be reissued. However, since the ranks are provided with a large margin, this rank provision can be performed within a constant time. When adjacent ranks have the same value, all the ranks are changed, and the labor required is equivalent to the number of transit points.

Based on the above described idea, an explanation will now be given for a method for determining whether the hard time window restriction is established for the route A→D→B→C→E→F→B→G that is obtained by moving the path D, in the route A→B→C→D→E→F→G, to the position following the transit point A, and whether the new route is better than the original route when the change of the soft time window and the travel time are taken into account.

The evaluation processing is performed as follows.

(1) The arrival time for the path D is calculated, and when the arrival time falls outside the range represented by the EST and LST for the path D, this conflicts with the provisions of the restriction and no evaluation is performed. If the arrival time falls within the range, however, the provisions of the restriction are complied with and the cost reduction due to the soft time window is calculated. Since the dynamic data for the path D is obtained by subtracting the path E→F→G from the path D→E→F→G, the EST and LST to be referred to here are not strictly accurate values.

(2) The arrival time at E is calculated. When all the polynomials to be handled increase monotonically, and when the arrival time seems to be later than the current time, the cost for the new route obtained by changing the original route is greater than the current one, so that the evaluation of the route is halted. When the polynomials do not increase monotonically (the quadratic function having a bowl-like shape is handled), the processing advances to the next step.

(3) The arrival time for the path B→C is calculated, and when the arrival time falls outside the range represented by the EST and LST, this conflicts with the provisions of the restriction and the route evaluation is halted. If the arrival time falls within the range, however, the provisions of the restriction are complied with and the cost reduction due to the soft time window is calculated. Since the dynamic data for the path B→C is obtained by subtracting the path D→E→F→G from the path B→C→D→E→F→G, the EST and LST to be referred to are not strictly accurate values.

(4) The arrival time for the path E→F→G is calculated, and when the arrival time falls outside the range represented by the EST and LST, this conflicts with the provisions of the restriction and the route evaluation is halted. If the arrival time falls within the range, however, the cost reduction due to the soft time window is calculated.

(5) If the sum of the cost reductions due to the soft time windows for the paths D, B→C and E→F→G and the reduction in the travel distance (the cost obtained by recalculating the distance) is either zero or a negative value, the route evaluation is halted.

(6) The accurate EST and LST are calculated by tracking the transit points on the path D and path B→C, and a check is performed to determine whether the arrival times at the paths fall within the range represented by the EST and LST. When the arrival times fall outside the range, the route evaluation is halted.

(7) Through this processing, it is confirmed that the hard time window of the route obtained after the path D has been moved satisfies the provisions of the restriction, and that the cost required for the obtained route is smaller than the cost required for the original route.

The above evaluation processing will now be described in more detail. Assume that the length of the route A→B→C→D→E→F→G is always stored in L_total. The following static data are defined in correlation with the transit points A to G. It should be noted that the static data are data having a constant value, regardless of whether the route is changed.

EST: e_A, e_B, . . . , e_G

LST: l_A, l_B, . . . , l_G

Addition-enabled soft time window (represented by a polynomial for time t): f_A(t), f_B(t), . . . , f_G(t) Working time: w_A, w_B, . . . , w_G The following dynamic data are defined in correlation with the transit points A to G. It should be noted that the dynamic data are those whose values are updated as needed during the calculation.

EST: E_A, E_B, . . . , E_G

LST: L_A, L_B, . . . , L_G

Length (width): W_A, W_B, . . . , W_G

Soft time window: F_A(t), F_B(t), . . . , F_G(t)

Further, the following data are defined in correlation with the transit points.

Rank: r_A, r_B, . . . , r_G

Arrival time offset: a_A, a_B, . . . , a_G

Furthermore, the arrival time base pointer for the arrival time offset is defined as Tb, the highest rank of the transit point for which the soft time window for the dynamic data is valid is defined as R, and the pointer to the transit point having the highest rank for which the soft time window of the dynamic data is valid is defined as P. Also, the time for traveling between the transit points X and Y is defined as d(X, Y), and the time interval between the arrival time at the transit point X and the arrival time at the transit point Y is defined as u(X, Y). The time u(X, Y) required to travel between the adjacent transit points is u(X, Y)=w_X+d(X, Y).

First, these data are initialized, and R=−1, P=NULL, r_A=70000, r_B=60000, r_C=50000, r_D=40000, r_E=30000, r_F=20000 and r_G=10000. The dynamic data are not set yet, but an arbitrary initial value is set for Tb.

Assume an operation whereby the path D is moved to a position immediately following A. First, since the arrival time at D is not known so long as the departure time at A is not known, the dynamic data following A must be set. When the rank r_A=7000 for A is compared with R, r_A>R, so that the dynamic data at A are invalid. Thus, the static data are added by scanning the route forward (=in the direction of travel) beginning at the transit point that is closest to the starting point that has valid dynamic data. However, since P=NULL, this means that all the dynamic data are invalid.

Therefore, the static data are calculated for individual transit points through inverse propagation to add the data, from the last transit point G to A. When P is not NULL, however, forward propagation is employed for the following process, beginning at the transit point indicated by P. Since the length of the route obtained by the re-calculation of time is L_total, the arrival time at G is set as a_G=L_total−u(G, A)−Tb. It should be noted that a_G is the arrival time offset value at G, calculated for the base Tb. Further, u(G, A)=w_G+d(G, A). As is shown in FIG. 4, since the route departs from A and returns to A, u(G, A) is set. If the route need not return to A, a_G=L_total−u(G, G)−Tb is established, and u(G, G)=w_G is obtained. In addition, the data are set as in F_G(t)=f_G(t), E_G=e_G, L_G=l_G, W_G=w_G+d(G, A). The arrival time offset for F, a_F, is a_F=a_G−u(F, G). The dynamic soft time window for F, i.e., the time window F_F(t) for the path F→G, is F_F(t)=f_F(t)+F_G(t+u(F, G)). E_F, which is the EST for the dynamic data for F, is set as E_F=max{e_F, E_G−u(F, G)}. L_F, which is the LST for the dynamic data for F, is set as min{l_F, L_G−u(F, G)}. While the length of the path following F, W_F, is set as W_G+u(F, G). This process is continued until A is reached, and R=70000 and P=A are set in order to record for reference the location whereat static data were propagated.

The polynomial (=dynamic soft time window) for the path D can be obtained as F_DD(t)=F_D(t)−F_E(t+(a_E−a_D)) by subtracting the time window following E from the time window following D (in order to identify the path D and the path following D, the path D is referred to as "DD"). At this time, a E−a D represents the length obtained by re-calculating the time required from D to E (=u(D, E)=w_D+d(D, E)). In this example, since the path D includes only one transit point, F_DD(t) is equal to f_D(t). The length W_DD of the path D is obtained by calculating W_D−W_E−d(D, E) (in this example, W_DD=w_D). E_DD, which is the dynamic EST for the path D, is set as max{E_D, E_E−(a E−a D)}, because generally the path D includes a great number of nodes and currently scanning the path D is not appropriate (it should be noted that the node as used has the same meaning as the transit point; while in the example in FIG. 4 the path D includes only the transit point D, assume that the path D includes multiple nodes or transit points). The value max{E_D, E_E−(a E−a D)} is employed as a lower limit, although a greater value may have been acquired for E_DD through the actual scanning of the path. Similarly, L_DD, which is the dynamic LST for the path D, is set to $\min\{L\_D, L\_E-(a\ E-a\ D)\}$, which is employed as the upper limit value. In this example, the dynamic EST and LST are accurate values.

Since the dynamic hard time window for the path D is obtained, a check is performed to determine whether the arrival time at D conflicts with the provisions of the restriction ($E\_DD \leq a\_A+Tb+u(A, D) \leq L\_DD$), and if it does, the processing is terminated. Generally, since E_DD and L_DD are currently the respective lower limit value and upper limit value, it should be noted that the arrival time may actually conflict with the provisions of the restriction, even if it is not so determined at this time. Since the arrival time currently complies with the provisions of the restriction, the cost reduction for the path D soft time window is calculated as follows:

$$F\_DD(a\_D+Tb)-F\_DD(a\_A+Tb+u(A, D)).$$

Similarly, the dynamic data E_BC, L_BC, F_BC and W_BC for the path B→C are obtained by subtracting the dynamic data for D from the dynamic data for B. Then, a check is performed to determine whether the arrival time at the path B→C conflicts with the provisions of the restriction ($E\_BC \leq a\_A+Tb+u(A, D)+W\_DD+d(D, B) \leq L\_BC$), and if it does, the processing is terminated. Otherwise, the cost reduction for the path B→C is calculated as follows: F_BC(a_B+Tb) F_BC(a_A+Tb+u(A, D)+W_DD+u (D, B)).

The reduction for the route length, L_reduce, is easily calculated as follows:

L_reduce=d(C, D)+d(D, E)+d(A, B)−d(A, D)−d(D, B)−d (C, E).

Since the arrival time at the path E→F→G is shifted a time equivalent to L_reduce, the cost reduction for the soft time window of the path E→F→G is calculated as follows: cost reduction=F_E(a_E+Tb)−F_E(a_E+Tb−L_reduce). When the sum of the cost re-calculation value for the reduction of the length of the route, L_reduce, and the cost reductions for the soft time windows for the paths D, B→C and E→F→G is either zero or a negative value, the processing is terminated.

Through the above processing, it is found that the cost is reduced by the pertinent route change, accurate values for E_DD, L_DD, E_BC and L_BC are obtained by scanning the paths D and B→C, and the arrival times are examined. If for the hard time window for either path a conflict with the provisions of the restriction occurs, the processing is terminated.

Finally, the path D is actually moved to a position immediately following A. The rank of the path D after being moved is defined as r_D=65000 by dividing the interval between r_A and r_B equally. Since only the dynamic data following E are valid after D is moved, R=r_E and P=E are set. Further, although it should be noted that the values of a_E, a_F and a_G are unchanged, since the arrival times at the transit points E, F and G are shifted a time equivalent to L_reduce, the base pointer is updated (Tb→Tb−L_reduce). Similarly, L_total is updated based on the route length reduction provided by the re-calculation of the time (L_total→L_total−L_reduce).

An explanation will now be given for an example wherein the routing problem is applied for a delivery route scheduling problem for the distribution field. For the delivery route scheduling problem, for example, an included problem is that "travel to all the transit points by multiple trucks must occur within a predetermined period of time, and each transit point should be visited within a specifically designated time window. Calculate a delivery route for which the route length and the total costs due to the soft time window are minimized." When the transit points on the routing problem are defined as delivery destinations, and the route is defined as a delivery route for a truck, the routing problem becomes a delivery route scheduling problem for the distribution field. Generally, multiple trucks are employed, and any of the trucks may deliver goods to any of the delivery destinations. Therefore, it is preferable that the required number of trucks or the total delivery time be minimized by moving a specific delivery destination from the delivery route for a certain truck to the delivery route for another truck, or by changing the order in which deliveries for a specific delivery route are made. For this problem, for the convenience of delivery destinations, deliveries may only be permitted within specified time ranges; for example, cases wherein space for unloading is limited, or cases wherein stocking must be completed before the beginning of the operating hours. These restrictions can be written into the hard time window. And when in the hard time window it is stipulated that the goods are to be delivered as early as possible, the soft time window may be designated, since only the soft time window may be employed without the hard time window being set. For an operation such as one for supplementing the supply of beverages in automatic vending machines, an optimal delivery route using multiple trucks is required to service several tens of thousands of delivery destinations. In this case, the expectation is that when cost evaluation is efficiently performed using the method of the invention, a schedule for the route can be prepared within a practical period of time.

Figure 9:
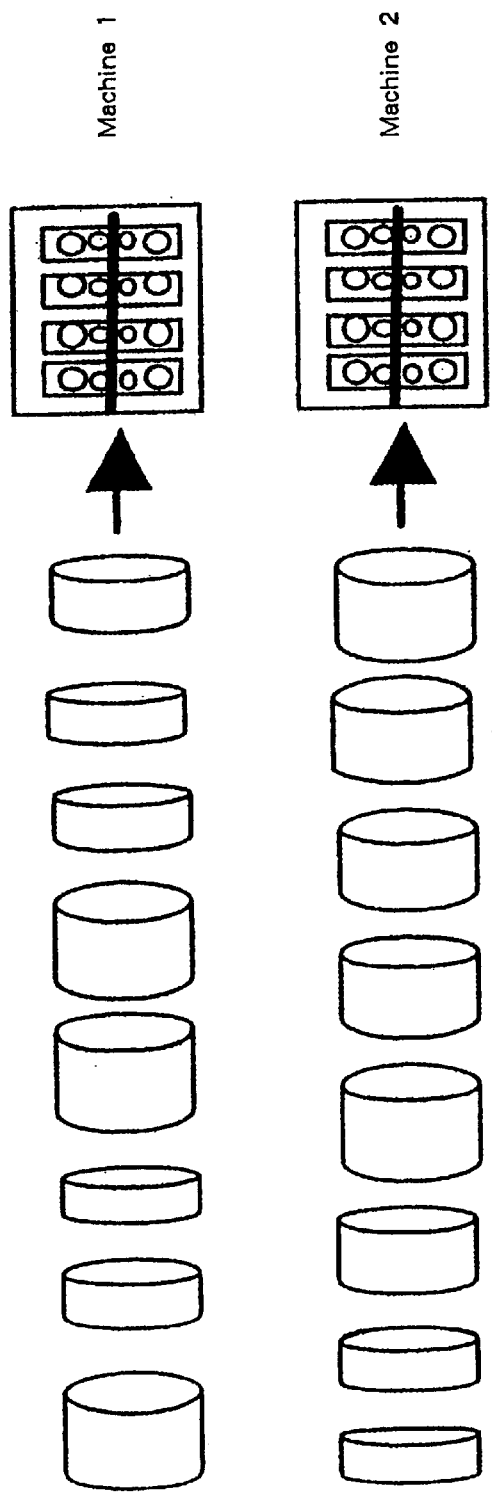
FIG. 9 is a diagram for a job shop scheduling problem showing the relationship between multiple machines and the jobs to be processed by the machines.

An explanation will now be given for another example wherein the routing problem is applied for a job shop scheduling problem for a manufacturing field. For a job shop scheduling problem, an included problem, for example, is that "A job should be processed by multiple machines and the processing for each job should be performed within a time specifically designated for a time window. A production schedule must be prepared according to which the total production time length and the soft time window are minimized." FIG. 9 is a diagram for the job shop scheduling problem showing the relationship between multiple machines and jobs processed on the machines. When a transit point is regarded as a job and a route is regarded as the order according to which jobs are processed on the machines, the routing problem can be a regarded as job shop scheduling problem for a manufacturing field. For example, when a final, manufactured product is to be produced by employing several processing steps to finish a semi-completed product, how to determine the order in which jobs are to be processed at a specific step constitutes the job shop scheduling problem. In such a case, generally, multiple machines are available, and any machine may be employed, depending on the job at hand. Therefore, overall, it is preferable that the production time be minimized by moving a job from the schedule for a specific machine to the schedule for another machine, or by exchanging the jobs scheduled for specific machines. Since individual, semi-completed products are processed in order at each step, the finish time at a preceding step is employed to determine the earliest job processing time for a later step. Further, the finishing time allocated for each step is limited and must conform to a scheduled delivery time. Restrictions such as these can be written for using the hard time window. Also, when the processing of products is performed immediately following the EST, even within the hard time window, it will be difficult to cope with a delay at a preceding step. While when the processing for a product is performed near the LST, the time will be extended where products are stored as stock at the frontage of the manufacture process. Thus, in order to reduce stocking levels while maintaining an appropriate, safe stock supply, the soft time window can be set so that costs required at specific times during the use of the hard time window are minimized. In a job shop scheduling problem for the manufacture of steel, several tens of thousands of jobs must be scheduled by the execution of the route search system over a period of from 30 minutes to one hour. In this case, it is inevitable that by using the invention, efficiency in reducing the cost of an evaluation of a route search will be realized.

When the routing problem is applied, for example, for a job shop scheduling problem involving the manufacture of steel, generally the included processes are cold rolling, annealing and plating, and not only delivery times, but also limitations applying to thicknesses, widths and types to be provided as plates using the cold rolling process differ. Since an extended period of time is required for a cold rolling machine to change the thicknesses, widths and types of plates, when cold rolling is the process that is used (hereinafter these processes are referred to as jobs), and jobs are rearranged so as to minimize the required time, productivity can be increased. Here it should be noted that the time limit for each job must be maintained at a pertinent step, and the plates must be produced as early as possible to reduce the stock on hand for processing. In addition, an appropriate time period must be provided for storage of stock to be processed for each job. Thus, when the earliest time for the initiation of a process (the earliest arrival time), the latest time for the initiation of a process (the latest arrival time), the preparation of a soft time window, and the work time and the time required for changing jobs (the time required for transferring between jobs) are set, this problem is regarded as a route search problem, and a schedule is prepared ensuring that individual steps are performed so that all jobs are completed at the lowest cost.

DESCRIPTION OF SYMBOLS

10: Route search system
12: Rank provision means
14: Rank storage means
16: Transit point pointer
20: Validity determination means
22: Dynamic penalty function addition means
24: First dynamic earliest arrival time calculation means
26: First dynamic latest arrival time calculation means
28: First dynamic length calculation means
30: First arrival time offset calculation means
36: Route segment
38: Route segment dynamic penalty function calculation means
40: Second dynamic earliest arrival time calculation means
42: Second dynamic latest arrival time calculation means
44: Second arrival time offset calculation means
46: Route segment penalty cost calculation means
47: Length cost calculation means
48: Route evaluation means
50: Time offset holding means

I claim:

1. A route search system comprising:

dynamic penalty function addition means;

route segment dynamic penalty function calculation means;

route segment penalty cost calculation means;

route evaluation means; and dynamic penalty function validity determination means, wherein a static penalty function f, which is a cost function of an arrival time variable t and is a base for calculation of a penalty cost, is set for each transit point, wherein said static penalty function f is so defined that said static penalty functions for individual transit points are enabled to be added, wherein an original route and a trial route are evaluated based on the total cost CT that includes, for each route, at least a penalty cost CS and a length cost CL, wherein the direction toward the first of a route is called the inverse direction of travel and the direction toward the end of said route is called the direction of travel, and wherein a dynamic penalty function F is correlated with each transit point.

2. The route search system according to claim 1, wherein said dynamic penalty function addition means calculates said dynamic penalty function F for each transit point along said route, extending backward, in the direction opposite to that of normal propagation, from the last transit point $P_z$, wherein, when an arbitrary transit point is called P1 and a succeeding transit point in the direction of travel is called P2, said dynamic penalty function addition means calculates a dynamic penalty function F for P1 based on the sum of a static penalty function f for P1 and the dynamic penalty function F for P2, while, it should be noted, for the dynamic penalty function addition, a t in said dynamic penalty function F for P2 is defined as a t in said static penalty function f, to which a value equal to the difference between the arrival time for P2 and the arrival time for P1 is added.

3. The route search system according to claim 2, wherein, when the first and last transit points along a target route segment to be changed on the original route are called P1 and P2 (P2=P1 may be established) and the succeeding transit point, following P2, along said original route in the direction of travel is called P3, and when said dynamic penalty function validity determination means determines that the dynamic penalty functions for transit points following P1, along said original route, are valid, said route segment dynamic penalty function calculation means, the dynamic penalty function F for said target route segment is calculated based on the results obtained by subtracting the dynamic penalty function F for P3 from the dynamic penalty function F for P1, while, it should be noted, a t in the dynamic penalty function for P3 is defined as said t in the dynamic penalty function for P1, to which the difference between the arrival time for P3 and the arrival time for P1 is added, wherein, when the first transit points along said target route segments of said original route and a trial route are defined as P1, said route segment penalty cost calculation means calculates penalty costs for said target route segments by substituting the arrival times at said transit points P1 along said original route and said trail route into arrival time variables t in said dynamic penalty functions of said route segments that are obtained by said route segment dynamic penalty function calculation means.

4. The route search system of claim 3, wherein said route evaluation means evaluates said original route and said trial route by comparison of said penalty costs for said target change route segments.

5. The route search system according to claim 4, wherein, when the succeeding transit points of the last target route segments to be changed on said original route and of said trial route in the direction of travel are defined as P3, and when route segments from the transit points P3 to Pz are called forward route segments, said route segment penalty cost calculation means calculates the penalty costs for said forward route segments of said original route and of said trial route by substituting the arrival times at said transit points P3 along said original route and along said trial route into the arrival time variables t for the dynamic penalty functions for said transit points P3; and wherein said route evaluation means evaluates said original route and said trial route based on the comparison of said penalty costs for said forward route segments of said original route and of said trial route.

6. The route search system according to claim 5, further comprising:
   time offset holding means,
   wherein, as an arrival time, a time offset is employed that is represented by an offset, held by said time offset holding means, from a reference time Tb, and
   wherein, when the total cost CT of said trial route is smaller than the total cost CT of said original route, and each time said original route is updated to a trial route, said time offset holding means updates said reference time Tb based on a change L_reduce for the time re-calculation length of the updated route.

7. The route search system according to claim 6, further comprising:
   first arrival time offset calculation means, for calculating an arrival time offset a that, through inverse propagation initiated at said last transit point Pz, is set for each transit point along a route,
   wherein, when an arbitrary transit point is defined as P1 and an immediately succeeding transit point in the direction of travel is defined as P2, said first arrival time offset calculation means calculates an arrival time offset a_P1, for said transit point P1, based on the results obtained by subtracting from an arrival time offset a_P2, for said transit point P2, the sum of the time d(P1, P2), for the travel between P1 and P2, and a working time w_P1, for said transit point P1, and
   wherein said dynamic penalty function addition means determines, as said arrival time offset a, which is obtained by said first arrival time offset calculation means, an arrival time that is to be used by said dynamic penalty function addition means for calculating an arrival time difference.

8. The route search system according to claim 7, further comprising second arrival time offset calculation means,
   wherein it is ascertained that the arrival time offset a is changed at all the transit points along said trial route from a point whereat a target route segment to be changed is inserted or extracted,
   wherein the preceding transit point along the first target route segment to be changed on said original route in the direction of travel is defined as P0,
   wherein said second arrival time offset calculation means calculates an arrival time offset a_i at a transit point i using an arrival time offset a_P0 at P0 along a trial route in the direction of travel,
   wherein, when an arbitrary transit point is defined as P1 and an immediately succeeding transit point in the direction of travel is defined as P2, said second arrival time offset calculation means calculates an arrival time offset a_P2 at said transit point P2 based on the results obtained by adding an arrival time offset a_P1, at said transit point P1, to the sum of a working time w_P1 for P1, and time d(P1, P2) for the travel between P1 and P2,
   wherein said route segment penalty cost calculation means determines an arrival time, which is to be substituted into t in the dynamic penalty function for said route segment obtained by said route segment dynamic penalty function calculation means, as the time obtained by adding said reference time Tb to said arrival time offset a, that is obtained by said second arrival time offset calculation means for the first transit point along said route segment.

9. The route search system according to claim 8, further comprising:
   first dynamic earliest arrival time calculation means for calculating, through inverse propagation originating at the last transit point Pz, a dynamic earliest arrival time E that is correlated with a static earliest arrival time e that is set for each transit point along a route to inhibit an arrival earlier than said static earliest arrival time e,
   wherein, when an arbitrary transit point is defined as P1 and the immediately succeeding transit point in the direction of travel is defined as P2, said first dynamic earliest arrival time calculation means determines said dynamic earliest arrival time E for P1, as a later time, either a static earliest arrival time e_P1 for P1, or the value obtained by subtracting from a dynamic earliest arrival time E_P2 for P2, the sum of a work time w_P1 for P1, and a time d(P1, P2) for the travel between P1 and P2, and
   wherein, when the time obtained by adding said reference time Tb to said arrival time offset a, which is obtained for said forward route segment of said trial route by said first arrival time offset calculation means, is earlier than said dynamic earliest arrival time E for said forward route segment, which is obtained by said first dynamic earliest arrival time calculation means, said penalty cost calculation means halts the calculation of a penalty cost for said forward route segment of said trial route.

10. The route search system according to claim 9, further comprising:
    second dynamic earliest arrival time calculation means, for calculating the dynamic earliest arrival time E for a target route segment to be changed,
    wherein, when the first and the last transit points along said target route segment to be changed are called P1 and P2 (P2=P1 may be established), said second dynamic earliest arrival time calculation means determines, as said dynamic earliest arrival time E for said target route segment to be changed, which is the later time, the static earliest arrival time e_P1 for P1, or a value obtained by subtracting from the static earliest arrival time e_P2 for P2, the difference between a_P2 and a_P1, which are arrival time offsets for P2 and P1 obtained by said first arrival time offset calculation means, and wherein, when the time value obtained by adding said reference time Tb to the arrival time offset a, which is calculated by said first or second arrival time offset calculation means for said target route segment to be changed on said trial route, precedes said dynamic earliest arrival time E for said target route segment that is obtained by said second dynamic earliest arrival time calculation means, said penalty cost calculation means halts the calculation of the penalty cost for said target route segment to be changed on said trial route.

11. The route search system according to claim 10, further comprising:

first dynamic latest arrival time calculation means for calculating, through inverse propagation originating at the last transit point Pz, a dynamic latest arrival time L that is correlated with a static latest arrival time 1 that is set for each transit point along a route to inhibit an arrival later than said static latest arrival time 1, wherein, when an arbitrary transit point is defined as P1 and the immediately succeeding transit point in the direction of travel is defined as P2, said first dynamic latest arrival time calculation means determines said dynamic latest arrival time L for P1, as an earlier time, either a static latest arrival time 1_P1 for P1, or the value obtained by subtracting from a dynamic latest arrival time L_P2 for P2, the sum of a work time w_P1 for P1, and a time d(P1, P2) for the travel between P1 and P2, and wherein, when the time obtained by adding said reference time Tb to said arrival time offset a, which is obtained for said forward route segment of said trial route by said first arrival time offset calculation means, is later than said dynamic latest arrival time L for said forward route segment, which is obtained by said first dynamic latest arrival time calculation means, said penalty cost calculation means halts the calculation of a penalty cost for said forward route segment of said trial route.

12. The route search system according to claim 11, further comprising:

second dynamic latest arrival time calculation means, for calculating the dynamic latest arrival time L for a target route segment to be changed, wherein, when the first and the last transit points along said target route segment to be changed are called P1 and P2 (P2=P1 may be established), said second dynamic latest arrival time calculation means determines, as said dynamic latest arrival time L for said target route segment to be changed, which is the earlier time, the static latest arrival time 1_P1 for P1, or a value obtained by subtracting from the static latest arrival time 1_P2 for P2, the difference between a_P2 and a_P1, which are arrival time offsets for P2 and P1 obtained by said first arrival time offset calculation means, and wherein, when the time value obtained by adding said reference time Tb to the arrival time offset a, which is calculated by said first or second arrival time offset calculation means for said target route segment to be changed on said trial route, precedes said dynamic latest arrival time L for said target route segment to be changed that is obtained by said second dynamic latest arrival time calculation means, said penalty cost calculation means halts the calculation of the penalty cost for said target route segment to be changed on said trial route.

13. The route search system according to claim 9, further comprising:

first dynamic length calculation means for calculating a dynamic length W, which is correlated with each transit point along a route, through inverse propagation originating at the last transit point Pz;

arrival time offset validity determination means; and second dynamic length calculation means.

14. The route search system according to claim 13, wherein, when an arbitrary transit point is defined as P1 and the immediately succeeding transit point in the direction of travel is defined as P2, said first dynamic length calculation means determines, as a dynamic length W_P1 for P1, a value based on the results obtained by adding a dynamic length W_P2 for P2, to the sum of the travel time between P1 and P2 and a working time for P1, wherein, when said arrival time offset validity determination means ascertains that arrival time offsets for transit points following P1 along the original route are valid, and when the first and last transit points along said target route segment to be changed are called P1 and P2 (P2=P1 may be established) and the succeeding transit point, following P2, along the original route in the direction of travel is called P3, said second dynamic length calculation means obtains said dynamic length W for said target route segment to be changed by subtracting from a dynamic length W_P1 for P1, the sum of a dynamic length W_P3 for P3, and the travel time between P2 and P3, and wherein, when a dynamic length for said target route segment obtained by said second dynamic length calculation means is defined as W, said second arrival time offset calculation means calculates an arrival time offset of a_P3 for P3, based on the results obtained by adding an arrival time offset a_P1 for P1, to the sum of said dynamic length W and the travel time between P2 and P3.

15. The route search system according to claim 14, further comprising:

rank provision means for providing ranks, in descending order in the direction of travel, for transit points along a route;

rank storage means for, when said dynamic penalty function addition means initiates the propagation of said dynamic penalty function, storing the ranks at the foremost transit point from a transit point that has been propagated, wherein, when a transit point has a rank value equal to or smaller than a value stored in said rank storage means, said dynamic penalty function validity determination means ascertains that a dynamic penalty function for said transit point is valid, and wherein, when said original route is updated to a trial route, and when P0 and P3 denote transit points in the inverse direction of travel and in the forward direction of travel from a point on the updated route whereat a target route segment to be changed is inserted, said rank provision means provides intermediate ranks between the rank for P0 and the rank for P3 for the individual transit points in the descending order in the direction of travel along said target route segment to be changed on said updated route.

16. The route search system according to claim 15, wherein the inverse propagation, by the individual means, of said dynamic penalty function F, said dynamic earliest arrival time E, said dynamic latest arrival time L and said dynamic length W occurs simultaneously; and wherein said dynamic penalty function validity determination means also serves as means for determining whether said dynamic earliest arrival time E, said dynamic latest arrival time L and said dynamic length W for each transit point are valid.

17. The route search system according to claim 16, further comprising:
a transit point pointer, for, when inverse propagation of said dynamic penalty function F, said dynamic earliest arrival time E, said dynamic latest arrival time L and said dynamic length W is employed, pointing at the foremost transit point from a transit point that has been inversely propagated,
wherein the contents of said transit point pointer are updated, so that said transit point pointer designates as the next transit point a transit point that, in the direction of travel, is adjacent to the last target route segment to be changed on the updated route, and
wherein inverse propagation is next employed for said dynamic penalty function F, said dynamic earliest arrival time E, said dynamic latest arrival time L and said dynamic length W, beginning at a transit point preceding the transit point pointed at by said transit point pointer.

18. The route search system according to claim 4, wherein changes effected for a route segment of a route include the movement and the deletion of a route segment and the insertion of said route segment into another predetermined location in another route.

19. A route search method comprising:
a dynamic penalty function addition step;
a route segment dynamic penalty function calculation step;
a route segment penalty cost calculation step;
a route evaluation step; and
a dynamic penalty function validity determination step,
wherein a static penalty function f, which is a cost function of an arrival time variable
t and is a base for calculation of a penalty cost, is set for each transit point, wherein said static penalty function f is so defined that said static penalty functions for
individual transit points are enabled to be added, wherein, among two routes to be compared, a reference route is called an original
route, and a route obtained by changing said original route is called a trial route, wherein an original route and a trial route are evaluated based on the total cost CT
that includes, for each route, at least a penalty cost CS and a length cost CL, wherein a dynamic penalty function F is correlated with each transit point.

20. The route search method according to claim 19,
wherein, at said dynamic penalty function addition step, said dynamic penalty function F is calculated for each transit point along said route, extending backward, in the direction opposite to that of normal propagation, from the last transit point $P_z$,
wherein, when an arbitrary transit point is called P1 and a succeeding transit point in the direction of travel is called P2, at said dynamic penalty function addition step, a dynamic penalty function F for P1 is calculated based on the sum of a static penalty function f for P1 and the dynamic penalty function F for P2, while, it should be noted, for the dynamic penalty function addition, a t in said dynamic penalty function F for P2 is defined as a t in said static penalty function f, to which a value equal to the difference between the arrival time for P2 and the arrival time for P1 is added.

21. The route search method according to claim 20,
wherein, when the first and last transit points along a target route segment to be changed on the original route are called P1 and P2 (P2=P1 may be established) and the succeeding transit point, following P2, along said original route in the direction of travel is called P3, and when it is determined at said dynamic penalty function validity determination step that the dynamic penalty functions for transit points following P1, along said original route, are valid, at said route segment dynamic penalty function calculation step, the dynamic penalty function F for said target route segment is calculated based on the results obtained by subtracting the dynamic penalty function F for P3 from the dynamic penalty function F for P1, while, it should be noted, a t in the dynamic penalty function for P3 is defined as said t in the dynamic penalty function for P1, to which the difference between the arrival time for P3 and the arrival time for P1 is added,
wherein, when the first transit points along said target route segments to be changed of said original route and a trial route are defined as P1, at said route segment penalty cost calculation step, penalty costs for said target route segments are calculated by substituting the arrival times at said transit points P1 along said original route and said trail route into arrival time variables t in said dynamic penalty functions of said route segments that are obtained at said route segment dynamic penalty function calculation step.

22. The route search method according to claim 21,
wherein, at said route evaluation step, said original route and said trial route are evaluated by comparison of said penalty costs for said target change route segments.

23. The route search method according to claim 22, wherein, when the succeeding transit points of the last target route segments to be changed on said original route and of said trial route in the direction of travel are defined as P3, and when route segments from the transit points P3 to Pz are called forward route segments, at said route segment penalty cost calculation step, the penalty costs for said forward route segments of said original route and of said trial route are calculated by substituting the arrival times at said transit points P3 along said original route and along said trial route into the arrival time variables t for the dynamic penalty functions for said transit points P3; and wherein, at said route evaluation step, said original route and said trial route are evaluated based on the comparison of said penalty costs for said forward route segments of said original route and of said trial route.

24. The route search method according to claim 23, further comprising:
a time offset holding step,
wherein, as an arrival time, a time offset is employed that is represented by an offset, held at said time offset holding step, from a reference time Tb, and
wherein, when the total cost CT of said trial route is smaller than the total cost CT of said original route, and each time said original route is updated to a trial route, at said time offset holding step, said reference time Tb is updated based on a change L__reduce for the time re-calculation length of the updated route.

25. The route search method according to claim 24, further comprising:

a first arrival time offset calculation step, of calculating an arrival time offset a that, through inverse propagation initiated at said last transit point Pz, is set for each transit point along a route, wherein, when an arbitrary transit point is defined as P1 and an immediately succeeding transit point in the direction of travel is defined as P2, at said first arrival time offset calculation step, an arrival time offset a__P1 for said transit point P1 is calculated based on the results obtained by subtracting from an arrival time offset a__P2 for said transit point P2, the sum of the time d(P1, P2) for the travel between P1 and P2, and a working time w__P1 for said transit point P1, and wherein an arrival time that is to be used at said dynamic penalty function addition step for calculating an arrival time difference is said arrival time offset a, which is obtained at said first arrival time offset calculation step.

26. The route search method according to claim 25, further comprising:

a second arrival time offset calculation step, wherein it is ascertained that the arrival time offset a is changed at all the transit points along said trial route from a point whereat a target route segment to be changed is inserted or extracted, wherein the preceding transit point along the first target route segment to be changed on said original route in the direction of travel is defined as P0, wherein, at said second arrival time offset calculation step, an arrival time offset a__i at a transit point i is calculated using an arrival time offset a__P0 at P0 along a trial route in the direction of travel, wherein, when an arbitrary transit point is defined as P1 and an immediately succeeding transit point in the direction of travel is defined as P2, at said second arrival time offset calculation step, an arrival time offset a__P2 at said transit point P2 is calculated based on the results obtained by adding an arrival time offset a__P1, at said transit point P1, to the sum of a working time w__P1 for P1, and time d(P1, P2) for the travel between P1 and P2.

27. The route search method according to claim 26, wherein, at said route segment penalty cost calculation step, an arrival time, which is to be substituted into t in the dynamic penalty function for said route segment obtained at said route segment dynamic penalty function calculation step, is determined as the time obtained by adding said reference time Tb to said arrival time offset a, that is obtained at said second arrival time offset calculation step for the first transit point along said route segment.

28. The route search method according to claim 27, further comprising:

a first dynamic earliest arrival time calculation step of calculating, through inverse propagation originating at the last transit point Pz, a dynamic earliest arrival time E that is correlated with a static earliest arrival time e that is set for each transit point along a route to inhibit an arrival earlier than said static earliest arrival time e, wherein, when an arbitrary transit point is defined as P1 and the immediately succeeding transit point in the direction of travel is defined as P2, at said first dynamic earliest arrival time calculation step, which is the later time, either a static earliest arrival time e__P1 for P1, or the value obtained by subtracting from a dynamic earliest arrival time E__P2 for P2, the sum of a work time w__P1 for P1 and a time d(P1, P2) for the travel between P1 and P2, is determined as said dynamic earliest arrival time E for P1, and wherein, when the time obtained by adding said reference time Tb to said arrival time offset a, which is obtained for said forward route segment of said trial route at said first arrival time offset calculation step, is earlier than said dynamic earliest arrival time E for said forward route segment, which is obtained at said first dynamic earliest arrival time calculation step, the calculation of a penalty cost for said forward route segment of said trial route is halted at said penalty cost calculation step.

29. The route search method according to claim 28, further comprising:

a second dynamic earliest arrival time calculation step of calculating the dynamic earliest arrival time E for a target route segment to be changed, wherein, when the first and the last transit points along said target route segment to be changed are called P1 and P2 (P2=P1 may be established), at said second dynamic earliest arrival time calculation step, a later time, either the static earliest arrival time e__P1 for P1, or a value obtained by subtracting, from the static earliest arrival time e__P2 for P2, the difference between a__P2 and a__P1, which are arrival time offsets for P2 and P1 obtained at said first arrival time offset calculation step, is determined as said dynamic earliest arrival time E for said target route segment to be changed, and wherein, when the time value obtained by adding said reference time Tb to the arrival time offset a, which is calculated at said first or second arrival time offset calculation step for said target route segment to be changed on said trial route, precedes said dynamic earliest arrival time E for said target route segment to be changed that is obtained at said second dynamic earliest arrival time calculation step, the calculation of the penalty cost for said target route segment to be changed on said trial route is halted at said penalty cost calculation step.

30. The route search method according to claim 29, further comprising:

a first dynamic latest arrival time calculation step of calculating, through inverse propagation originating at the last transit point Pz, a dynamic latest arrival time L that is correlated with a static latest arrival time 1 that is set for each transit point along a route to inhibit an arrival later than said static latest arrival time 1, wherein, when an arbitrary transit point is defined as P1 and the immediately succeeding transit point in the direction of travel is defined as P2, at said first dynamic latest arrival time calculation step, an earlier time, either a static latest arrival time l__P1 for P1, or the value obtained by subtracting from a dynamic latest arrival time L__P2 for P2, the sum of a work time w__P1 for P1 and a time d(P1, P2) for the travel between P1 and P2, is determined as said dynamic latest arrival time L for P1, and wherein, when the time obtained by adding said reference time Tb to said arrival time offset a, which is obtained for said forward route segment of said trial route at said first arrival time offset calculation step, is later than said dynamic latest arrival time L for said forward route segment, which is obtained at said first dynamic latest arrival time calculation step, the calculation of a penalty cost for said forward route segment of said trial route is halted at said penalty cost calculation step.

31. The route search method according to claim 30, further comprising:
  a second dynamic latest arrival time calculation step, of calculating the dynamic latest arrival time L for a target route segment to be changed,
  wherein, when the first and the last transit points along said target route segment to be changed are called P1 and P2 (P2=P1 may be established), at said second dynamic latest arrival time calculation step, which is the earlier time, the static latest arrival time l_P1 for P1, or a value obtained by subtracting from the static latest arrival time l_P2 for P2, the difference between a_P2 and a_P1, which are arrival time offsets for P2 and P1 obtained at said first arrival time offset calculation step, is determined as said dynamic latest arrival time L for said target route segment to be changed, and
  wherein, when the time value obtained by adding said reference time Tb to the arrival time offset a, which is calculated at said first or second arrival time offset calculation step for said target route segment to be changed on said trial route, precedes said dynamic latest arrival time L for said target route segment to be changed that is obtained at said second dynamic latest arrival time calculation step, the calculation of the penalty cost for said target route segment to be changed on said trial route is halted at said penalty cost calculation step.

32. The route search method according to claim 31, further comprising:
  a first dynamic length calculation step of calculating a dynamic length W, which is correlated with each transit point along a route, through inverse propagation originating at the last transit point Pz;
  an arrival time offset validity determination step; and
  a second dynamic length calculation step,
  wherein, when an arbitrary transit point is defined as P1 and the immediately succeeding transit point in the direction of travel is defined as P2, at said first dynamic length calculation step, a value based on the results obtained by adding a dynamic length W_P2 for P2, to the sum of the travel time between P1 and P2 and a working time for P1, is determined as a dynamic length W_P1 for P1,
  wherein, when it is ascertained at said arrival time offset validity determination step that arrival time offsets for transit points following P1 along the original route are valid, and when the first and last transit points along said target route segment to be changed are called P1 and P2 (P2=P1 may be established) and the succeeding transit point, following P2, along the original route in the direction of travel is called P3, at said second dynamic length calculation step, said dynamic length W for said target route segment is obtained by subtracting from a dynamic length W_P1 for P1, the sum of a dynamic length W_P3 for P3, and the travel time between P2 and P3.

33. The route search method according to claim 32, wherein, when a dynamic length for said target route segment obtained at said second dynamic length calculation step is defined as W, at said second arrival time offset calculation step, an arrival time offset of a_P3 for P3 is calculated based on the results obtained by adding an arrival time offset a_P1 for P1, to the sum of said dynamic length W and the travel time between P2 and P3.

34. The route search method according to claim 33, further comprising:
  a rank provision step of providing ranks, in descending order in the direction of travel, for transit points along a route;
  a rank storage step of, when the propagation of said dynamic penalty function is initiated at said dynamic penalty function addition step, storing the ranks at the foremost transit point from a transit point that has been propagated,
  wherein, when a transit point has a rank value equal to or smaller than a value stored at said rank storage step, it is ascertained at said dynamic penalty function validity determination step that a dynamic penalty function for said transit point is valid, and
  wherein, when said original route is updated to a trial route, and when P0 and P3 denote transit points in the inverse direction of travel and in the forward direction of travel from a point on the updated route whereat a target route segment to be changed is inserted, at said rank provision step, intermediate ranks between the rank for P0 and the rank for P3 are provided for the individual transit points in the descending order in the direction of travel along said target route segment to be changed on said updated route.

35. The route search method according to claim 34, wherein the inverse propagation, at the individual steps, of said dynamic penalty function F, said dynamic earliest arrival time E, said dynamic latest arrival time L and said dynamic length W occurs simultaneously; and wherein said dynamic penalty function validity determination step also serves as a step of determining whether said dynamic earliest arrival time E, said dynamic latest arrival time L and said dynamic length W for each transit point are valid.

36. The route search method according to claim 35, further comprising:
  a transit point pointer setting step of, when inverse propagation of said dynamic penalty function F, said dynamic earliest arrival time E, said dynamic latest arrival time L and said dynamic length W is employed, setting a transit pointer at the foremost transit point from a transit point that has been inversely propagated,
  wherein the contents of said transit point pointer are updated, so that said transit point pointer designates as the next transit point a transit point that, in the direction of travel, is adjacent to the last target route segment to be changed on the updated route, and
  wherein inverse propagation is next employed for said dynamic penalty function F, said dynamic earliest arrival time E, said dynamic latest arrival time L and said dynamic length W, beginning at a transit point preceding the transit point pointed at by said transit point pointer.

37. The route search method according to claim 22, wherein changes effected for a route segment of a route includes the movement and the deletion of a route segment and the insertion of said route segment into another predetermined location in another route.

* * * * *